United States Patent
Yashirodai et al.

(10) Patent No.: US 10,635,086 B2
(45) Date of Patent: Apr. 28, 2020

(54) METHOD OF ASSEMBLING TURBINE, ASSEMBLY WORK SUPPORTING SYSTEM, AND CONTROL PROGRAM

(71) Applicant: Mitsubishi Hitachi Power Systems, Ltd., Yokohama-shi, Kanagawa (JP)

(72) Inventors: Kenji Yashirodai, Yokohama (JP); Juichi Kodera, Yokohama (JP); Shunsuke Mizumi, Yokohama (JP); Koji Ishibashi, Yokohama (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 44 days.

(21) Appl. No.: 15/957,417

(22) Filed: Apr. 19, 2018

(65) Prior Publication Data
US 2018/0307205 A1    Oct. 25, 2018

(30) Foreign Application Priority Data
Apr. 20, 2017  (JP) ................. 2017-083510

(51) Int. Cl.
G05B 19/4097    (2006.01)
F01D 21/00     (2006.01)
(Continued)

(52) U.S. Cl.
CPC ....... *G05B 19/4097* (2013.01); *F01D 21/003* (2013.01); *F01D 25/243* (2013.01);
(Continued)

(58) Field of Classification Search
CPC ...... G05B 19/4097; G05B 2219/45055; G05B 2219/32359; G05B 2219/35134;
(Continued)

(56) References Cited

U.S. PATENT DOCUMENTS

| 5,627,761 A * | 5/1997 | Pollard .............. G01B 7/14 324/207.22 |
| 2008/0106714 A1* | 5/2008 | Okita ............... G03F 7/70633 355/53 |

(Continued)

FOREIGN PATENT DOCUMENTS

| JP | 3-67002 A | 3/1991 |
| JP | 6-55385 | 3/1994 |

(Continued)

OTHER PUBLICATIONS

Extended European Search Report issued in counterpart European Application No. 18168049.7 dated Aug. 20, 2018 (13 pages).

*Primary Examiner* — Robert E Fennema
*Assistant Examiner* — Jonathan Michael Skrzycki
(74) *Attorney, Agent, or Firm* — Crowell & Moring LLP

(57) ABSTRACT

The invention is directed to maintaining the accuracy in the positional adjustment of a stationary part while shortening a turbine assembly period through the omission of the temporary assembly of a casing. A method of assembling includes gaining measurement data on the configuration of a casing upper half part not fastened to a casing lower half part; gaining measurement data on the configuration of the casing lower half part in an open state in which the casing upper half part and a rotor are removed and in which a stationary part is mounted; comparing measurement data on the configuration of the casing upper half part and the casing lower half part with simulation data on the configuration of the casing upper half part and the casing lower half part previously obtained to select simulation data closest to the measurement data on the configuration of the casing upper half part and the casing lower half part; calculating, based on the selected simulation data, a change amount of the configuration of the casing upper half part and the casing lower half part when the casing upper half part is fastened to the (Continued)

casing lower half part in the open state; and adjusting the installation position of the stationary part inside the casing taking into account the calculated change amount.

12 Claims, 9 Drawing Sheets

(51) Int. Cl.
 *F01D 25/26* (2006.01)
 *F01D 25/24* (2006.01)
(52) U.S. Cl.
 CPC .......... *F01D 25/26* (2013.01); *F05D 2220/31* (2013.01); *F05D 2230/60* (2013.01); *F05D 2240/14* (2013.01); *F05D 2240/24* (2013.01); *F05D 2260/81* (2013.01); *G05B 2219/32359* (2013.01); *G05B 2219/35134* (2013.01); *G05B 2219/45055* (2013.01)

(58) Field of Classification Search
 CPC ...... F01D 25/243; F01D 25/26; F01D 21/003; F05D 2240/24; F05D 2220/31; F05D 2240/14; F05D 2230/60; F05D 2260/81
 See application file for complete search history.

(56) References Cited

U.S. PATENT DOCUMENTS

| | | | | |
|---|---|---|---|---|
| 2010/0260301 | A1* | 10/2010 | Galbally | G21C 17/00 376/247 |
| 2014/0139827 | A1* | 5/2014 | Cross | G01N 21/9515 356/237.2 |
| 2015/0167487 | A1 | 6/2015 | Willett, Jr. et al. | |

FOREIGN PATENT DOCUMENTS

| | | |
|---|---|---|
| JP | 2007-32504 A | 2/2007 |
| JP | 2011-89458 A | 5/2011 |

* cited by examiner

METHOD OF ASSEMBLING TURBINE, ASSEMBLY WORK SUPPORTING SYSTEM, AND CONTROL PROGRAM

BACKGROUND OF THE INVENTION

1. Field of the Invention

The present invention relates to a method of assembling a turbine, an assembly work supporting system, and a control program.

2. Description of the Related Art

Generally speaking, a casing of a turbine (the inner casing and the outer casing) is divided into a casing upper half part and a casing lower half part of the half-divided configuration, and flange portions of the casing upper half part and the casing lower half part are fastened to each other by bolts. Accommodated in the casing are diaphragms, etc. constituting a stationary part and a turbine rotor constituting a rotor rotating with respect to the stationary part.

Between the rotor and the stationary part covering the rotor, there exists a clearance, through which part of steam (working fluid) can pass. The flow thus passing through the clearance between the rotor and the stationary part opposite the same is referred to as the "leakage flow" as appropriate in the present specification. The leakage flow can be suppressed by providing a seal portion on the opposing surfaces of the rotor and the stationary part. In this case, the smaller the minute clearance between the distal end of the seal portion and the opposite portion thereof (hereinafter referred to as the minute clearance), the more the leakage flow can be suppressed. When, however, the minute clearance is too small, there is the possibility of the rotor coming into contact with the stationary part during the operation of the turbine. Then, a rubbing vibration is generated, and it becomes hard to secure the soundness of the turbine. Further, when the seal portion is worn, the flow rate of the leakage flow (leakage amount) increases, and the efficiency in power generation can be deteriorated. In view of this, generally speaking, the control of the minute clearance is conducted strictly. In particular, the assembly of the turbine is performed with scrupulous care in this regard.

The casing upper half part and the casing lower half part are deflected due to their own weight until they are fastened together by bolts. When they are fastened together by bolts, the position of the contact surface of the flange portion moves mainly in the upward direction. If, without taking this into consideration, the rotor and the stationary part are mounted to the casing lower half part to adjust the minute clearance, and the casing upper half part is installed on the casing lower half part to be fastened thereto by bolts, the minute clearance narrowed on the casing lower half part side, with the rotor being allowed in some cases to come into contact with the stationary part. Thus, the adjustment of the minute clearance in the turbine assembly operation requires a lot of steps. Usually, in the turbine assembly operation, in the state in which the components such as the turbine rotor and the diaphragm have been removed from the casing, i.e., in the state in which the casing is alone, the assembly is performed in the same way as in the final assembly stage of the turbine to measure the coordinates of the installation position of the stationary part, and, after removing the casing upper half part, the coordinates of the installation position of the stationary part are measured again, whereby the change amount of the installation position of the stationary part due to the assembly of the casing is calculated. The change amount in the installation position of the stationary part is calculated by measuring the moving amount in the radial direction of the installation position of the stationary part by using as a reference a piano wire stretched in the axial direction between the bearings of the casing lower half part so as to be matched with the axis of the turbine rotor. Subsequently, in the state in which the casing upper half part has been removed, the lower half part of the diaphragm (diaphragm lower half part) is incorporated, and, further, the turbine rotor and the upper half part of the diaphragm (diaphragm upper half part) are also incorporated. At this time, a lead wire is previously provided in the minute clearance, and the diaphragm and the turbine rotor are extracted again to measure the crush amount of the lead wire, whereby the size of the minute clearance in the assembled state of the turbine is calculated. Then, the installation position of the stationary part is adjusted taking into account the change amount of the installation position due to the assembly of the casing, and the turbine is finally assembled. Apart from the above method using a piano wire, the change amount of the installation position of the stationary part can be calculated by using a mandrel or a dummy rotor (see JP-1991-67002-A and JP-2007-32504-A, hereinafter referred to as Patent Documents 1 and 2).

SUMMARY OF THE INVENTION

Generally speaking, when calculating the change amount of the installation position of the stationary part due to the assembly of the casing, the casing upper half part is installed in the casing lower half part and shrinkage fastening by bolts is effected, thus temporarily assembling the casing. The "shrinkage fastening" is a method in which bolts are expanded through heating and nuts are threadedly engaged with the bolts thus expanded and in which the flange portions are firmly fastened to each other due to the contraction of the bolts at the time of cooling thereafter. In a method of this kind, it is necessary to heat and cool the bolts. In addition, the bolts fastening together the casing upper half part and the casing lower half part are very large and rather hard to cool. Thus, in the methods of Patent Documents 1 and 2, it is necessary to secure a very long period of time for the temporary assembly of the casing, which greatly affects the operation period of the periodical turbine inspection or the like. Further, in a case where the operation period is previously determined, it can be a cause to press upon the other steps. In addition, in the methods of Patent Documents 1 and 2, due to the difference in the skill level of the measurement workers, there is involved variation in the accuracy in the measurement of the moving amount of the stationary part, so that there is the possibility of deterioration in the positional adjustment accuracy for the stationary part. Further, it is hard to apply the methods to a turbine which cannot be entered by the measurement worker as in the case of a small turbine.

The present invention has been made in view of the above problems. It is an object of the present invention to provide a method of assembling a turbine, an assembly work supporting system, and a control program in which it is possible to maintain positional adjustment accuracy for a stationary part while shortening the turbine assembly period through omission of the temporary assembly of the casing.

To achieve the above object, there is provided, in accordance with the present invention, a method of assembling a turbine including a casing formed by fastening together a casing upper half part and a casing lower half part by bolts, a stationary part accommodated in the casing, and a rotor accommodated in the casing and configured to rotate with respect to the stationary part, the method including the steps of: gaining measurement data on a configuration of the casing upper half part not fastened to the casing lower half part; gaining measurement data on a configuration of the casing lower half part in an open state in which the casing upper half part and the rotor are removed and in which the stationary part is mounted; comparing measurement data on the configuration of the casing upper half part and the casing lower half part with simulation data on the configuration of the casing upper half part and the casing lower half part previously obtained through numerical analysis of a turbine model simulating characteristics of the turbine to select simulation data closest to the measurement data with respect to the configuration of the casing upper half part and the casing lower half part; calculating, based on the selected simulation data, a change amount of the configuration of the casing upper half part and the casing lower half part when the casing upper half part is fastened to the casing lower half part in the open state by the bolts; and adjusting an installation position of the stationary part inside the casing taking into account the calculated change amount to assemble the turbine.

According to the present invention, it is possible to provide a method of assembling a turbine, an assembly work supporting system, and a control program making it possible to maintain accuracy in the positional adjustment of the stationary part while shortening the turbine assembly period through omission of temporary assembly of the casing.

DESCRIPTION OF THE PREFERRED EMBODIMENTS

First Embodiment (Construction)

1. Turbine

Figure 1:
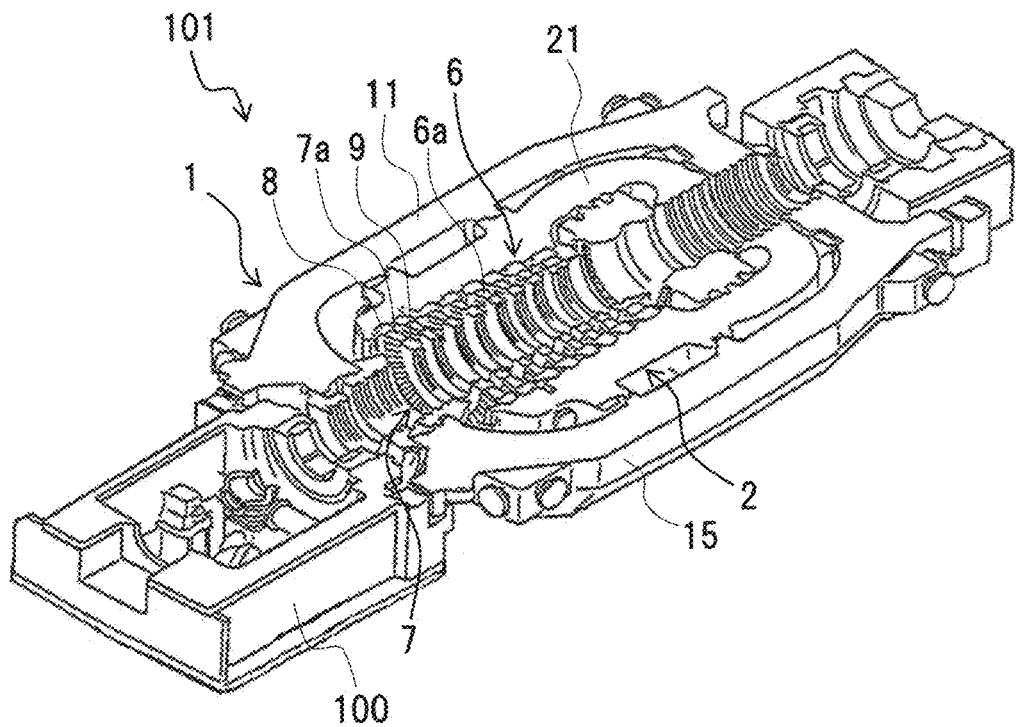
FIG. 1 is a perspective view of the lower half part of a steam turbine to which a method of assembling a turbine according to a first embodiment of the present invention is applicable.
Figure 2:
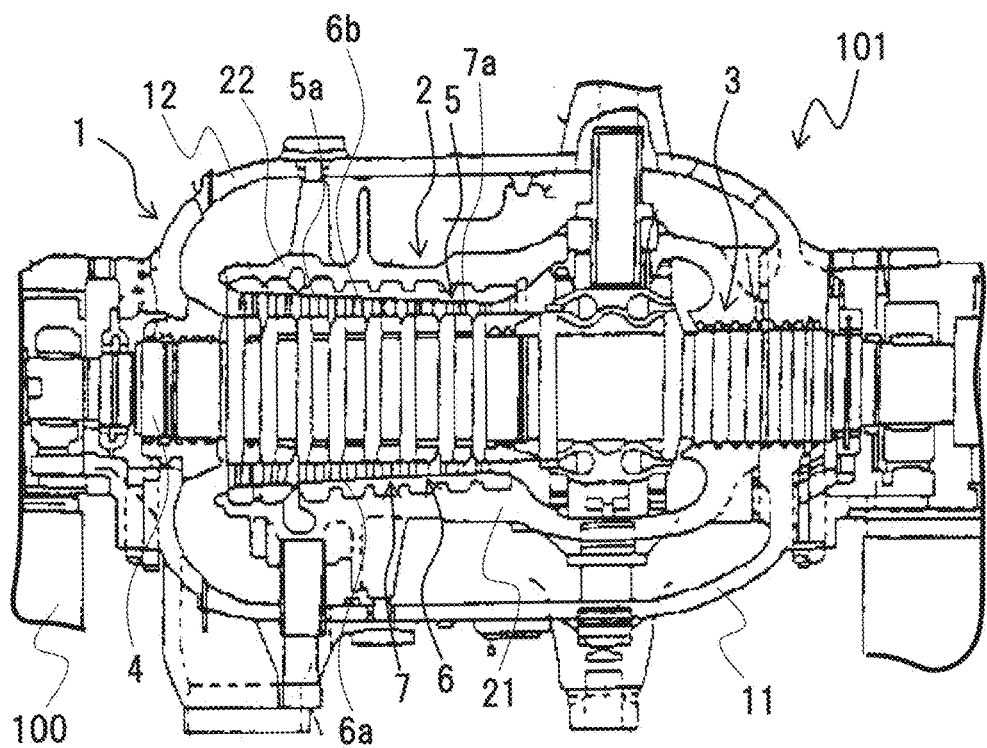
FIG. 2 is a longitudinal sectional view of the steam turbine to which the method of assembling a turbine according to the first embodiment of the present invention is applicable.
Figure 3:
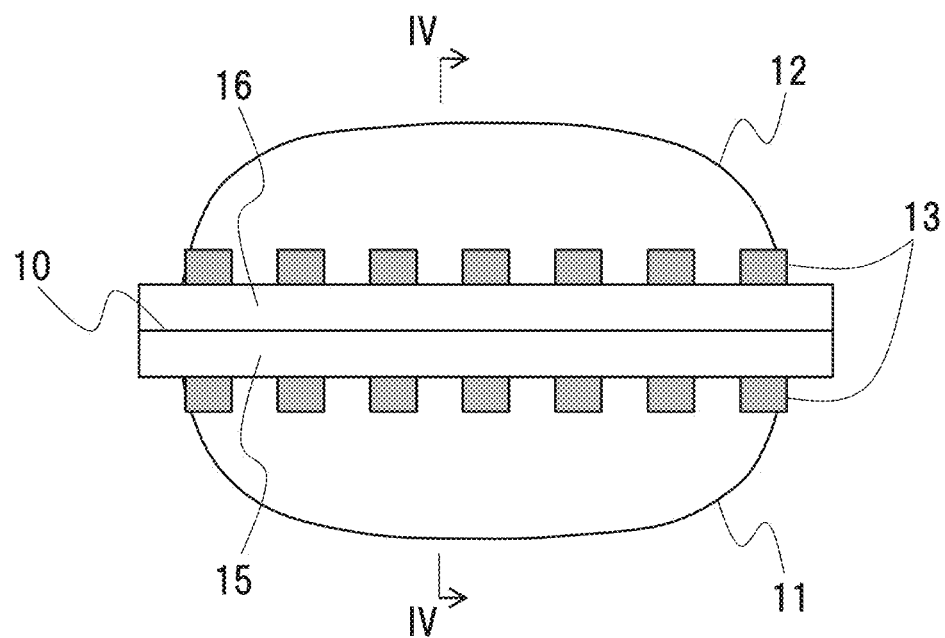
FIG. 3 is a side view of an outer casing of the steam turbine to which the method of assembling a turbine according to the first embodiment of the present invention is applicable.
Figure 4:
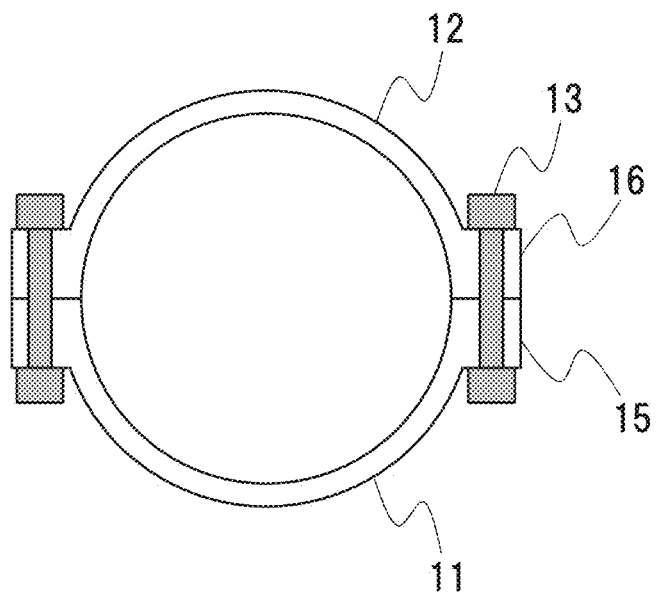
FIG. 4 is an arrow line sectional view taken along the arrow line IV-IV of FIG. 3.

FIG. 1 is a perspective view of the lower half part of a steam turbine to which a method of assembling a turbine according to a first embodiment of the present invention is applicable, FIG. 2 is a longitudinal sectional view of the steam turbine to which the method of assembling a turbine according to the first embodiment of the present invention is applicable, FIG. 3 is a side view of an outer casing of the steam turbine to which the method of assembling a turbine according to the first embodiment of the present invention is applicable, and FIG. 4 is an arrow line sectional view taken along the arrow line IV-IV of FIG. 3.

As shown in FIGS. 1 and 2, a steam turbine 101 according to the present embodiment is equipped with an outer casing 1 supported by a foundation 100, an inner casing 2 accommodated in the outer casing 1, and a turbine rotor 3 contained in the inner casing 2. The load of the turbine rotor 3 is supported, for example, by the foundation 100.

As shown in FIGS. 1 through 4, the outer casing 1 is divided into an outer casing lower half part 11 and an outer casing upper half part 12 by a horizontal joint flange surface (a surface parallel to the ground). In the connection portion, the outer casing lower half part 11 and the outer casing upper half part 12 have thick-walled flange portions 15 and 16. The outer casing lower half part 11 and the outer casing upper half part 12 are connected to each other through bolt fastening in which the flange portions 15 and 16 are firmly fastened to each other by using a plurality of bolts 13 and nuts (not shown), with contact surfaces 10 of the flange portions 15 and 16 opposite each other being superimposed one upon the other. In the vicinity of the flange surface of the flange portion 15 on the inner side of the outer casing 1, there are provided a plurality of inner casing support portions (not shown) supporting the inner casing 2.

The inner casing 2 is of a structure similar to that of the outer casing 1. That is, as shown in FIGS. 1 and 2, the inner casing 2 is divided into an inner casing lower half part 21 and an inner casing upper half part 22 by the horizontal joint flange surface. In the connection portion, the inner casing lower half part 21 and the inner casing upper half part 22 have thick-walled flange portions (not shown). They are connected to each other through bolt fastening in which the flange portions are firmly fastened to each other by using a plurality of bolts (not shown) and nuts (not shown), with contact surfaces of the flange portions opposite each other being superimposed one upon the other. The inner casing 2 is supported by the outer casing 1 via a position adjustment member (not shown) allowing thickness adjustment such as a shim.

The turbine rotor 3 is equipped with a rotor shaft 4 and a plurality of moving blade rows 5 arranged at axial intervals on the outer peripheral portion of the rotor shaft 4. Each moving blade rows 5 is composed of a plurality of moving blades 5a arranged annularly at peripheral intervals on the outer peripheral portion of the rotor shaft 4.

Incorporated into the inner casing 2 is a stationary part consisting of diaphragms 6 or the like. The diaphragms 6 are formed in an annular configuration, and a plurality of them are arranged at intervals in the axial direction of the turbine rotor 3. In the vicinity of the flange surface of the flange portion on the inner side of the inner casing 2, there are provided a plurality of stationary part support portions (not shown) supporting the stationary parts consisting of the diaphragms 6 or the like. The diaphragms 6 are supported by the inner casing 2 via a position adjustment member (not shown) allowing adjustment of the thickness of a shim or the like. Each diaphragm 6 is divided into a diaphragm lower half part 6a and a diaphragm upper half part 6b by a horizontal joint surface. Each diaphragm 6 is composed of a nozzle blade row 7 consisting of a plurality of nozzle blades 7a arranged annularly at intervals in the peripheral direction of the turbine rotor 3, an annular diaphragm outer ring 8 to which the distal end portion on the outer side in the radial direction of the nozzle blade 7a is fixed, and an annular diaphragm inner ring 9 to which the distal end portion on the inner side in the radial direction of the nozzle blade 7a is fixed. The nozzle blade row 7 are arranged side by side in the flowing direction of the working fluid. The moving blade rows 5 and the nozzle blade rows 7 are alternately provided in the flowing direction of the working fluid, with the nozzle blade rows 7 being arranged on the upstream side with respect to the moving blade rows 5. That is, the moving blade rows 5 and the nozzle blade rows 7 are provided alternately so as to be the nozzle blade row 7, the moving blade row 5, the nozzle blade row 7 . . . from the upstream side toward the downstream side. Each nozzle blade row 7 constitutes one section (blade section) together with each moving nozzle blade 5. The diaphragm inner ring 9 is provided with a seal fin (not shown). Between the seal fin (hereinafter, what is referred to as the diaphragm 6 will include the seal fin) and the turbine rotor 3, there is provided a minute clearance.

2. Turbine Assembling Method

In the present embodiment, there will be taken as an example a case where an existing turbine (an existing actual machine) which has been operated for a fixed period of time is disassembled and assembled again as in the case of the periodical inspection of a turbine.

2-1. Conventional Assembling Method

Figure 5:
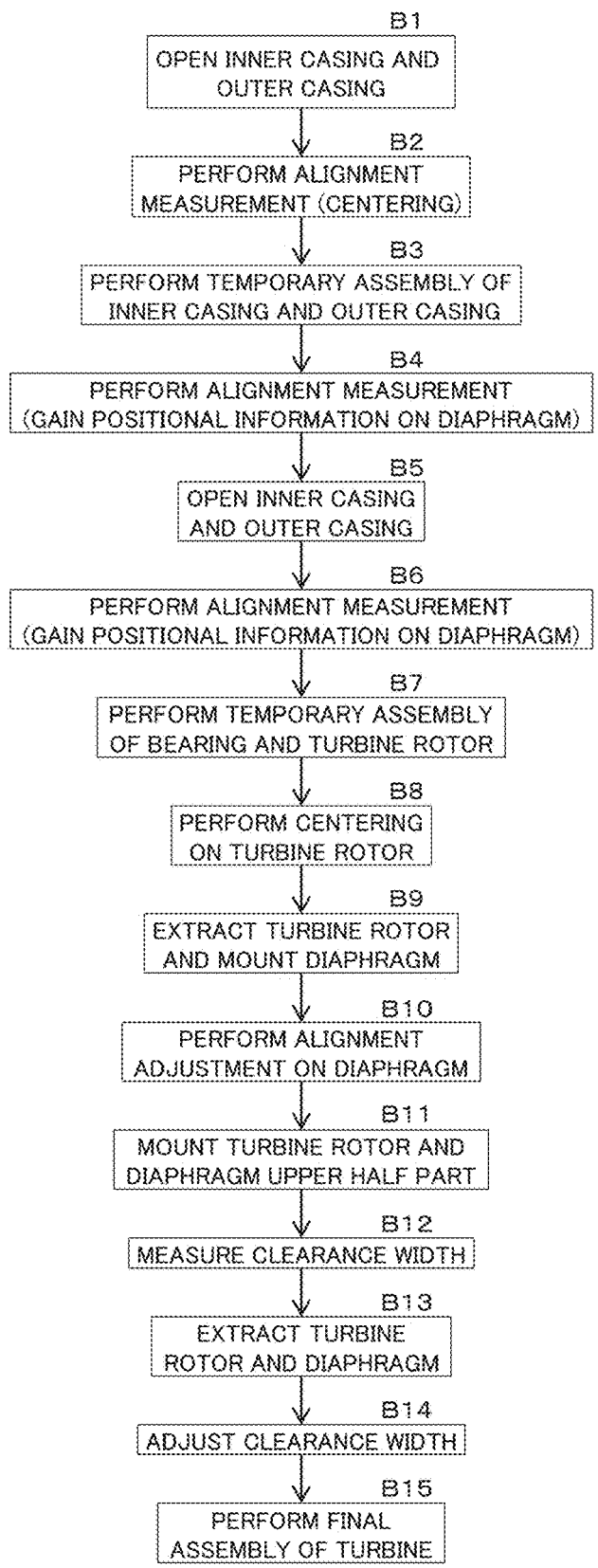
FIG. 5 is a flowchart illustrating the procedures of a conventional assembling method.

FIG. 5 is a flowchart illustrating the procedures of a conventional assembling method. In the following, the conventional assembling method will be described as a comparative example.

Step B1

On the spot (the place where the turbine operates), the inner casing and the outer casing of the existing actual machine is opened. More specifically, the bolts fastening the outer casing upper half part and the outer casing lower half part to each other are removed, and the outer casing upper half part is detached from the outer casing lower half part. Subsequently, the bolts fastening the inner casing upper half part and the inner casing lower half part to each other are removed, and the inner casing upper half part is detached from the inner casing lower half part.

Step B2

There is provided measurement for the alignment adjustment of the turbine rotor (centering). More specifically, the diaphragm upper half parts are detached from the diaphragm lower half parts, and the turbine rotor is extracted from the inner casing lower half part. Then, the core of the turbine rotor is measured.

Step B3

Temporary assembly of the inner casing and the outer casing is performed, and the assembled state of the turbine is simulated. More specifically, the temporary assembly of the diaphragms is performed by mounting the diaphragm upper half parts to the diaphragm lower half parts to perform the temporary assembly of the diaphragms. Subsequently, the inner casing upper half part is placed on the inner casing lower half part, and the inner casing upper half part and the inner casing lower half part are fastened together by bolts to perform the temporary assembly of the inner casing. Then, the outer casing upper half part is placed on the outer casing lower half part, and the outer casing upper half part and the outer casing lower half part are fastened together by bolts to perform the temporary assembly of the outer casing.

Step B4

In the state in which the temporary assembly of the inner casing and the outer casing has been performed, the measurement of the diaphragms for alignment adjustment is performed. More specifically, a piano wire is stretched in the axial direction between bearings provided in the inner casing lower half part so as to coincide with the axis of the turbine rotor 3 to form an imaginary axis, and the distance between the imaginary axis and the measurement point of the diaphragms is measured by using a micrometer, a laser detection device or the like. The measurement point of the diaphragms is, for example, at either the left or right side portion or the lower side portion of the inner peripheral surface of the diaphragms. While in the present embodiment the imaginary axis is formed by stretching a piano wire between the bearings provided in the inner casing lower half part, the imaginary axis may also be formed by applying a laser beam between the bearings provided in the inner casing lower half part. By the measurement of this step, it is possible to gain positional information on the diaphragms in the case where the outer casing upper half part and the outer casing lower half part, and the inner casing upper half part and the inner casing lower half part are respectively fastened together by bolts (that is, the distance between the imaginary axis and the diaphragm measurement point).

Step B5

The inner casing and the outer casing are opened. More specifically, the bolts fastening the outer casing upper half part and the outer casing lower half part to each other are removed, and the outer casing upper half part is detached from the outer casing lower half part. Subsequently, the bolts fastening the inner casing upper half part and the inner casing lower half part to each other are removed, and the inner casing upper half part is detached from the inner casing lower half part.

Step B6

The measurement of the diaphragms for alignment adjustment is performed in the state in which diaphragms have been mounted to the inner casing lower half part. More specifically, as in step B4, the distance between the imaginary axis and the diaphragm measurement point is measured. Through this measurement, it is possible to gain diaphragm positional information in the state in which the outer casing upper half part and the inner casing upper half part have been removed from the outer casing lower half part and the inner casing lower half part. Based on the diaphragm positional information gained in the present step and the diaphragm positional information gained in the above-described step B4, there is calculated information such as the displacement amount and displacement direction of the diaphragms (hereinafter referred to as the diaphragm displacement information as appropriate) when transition is effected from the state in which the outer casing upper half part, the inner casing upper half part, the outer casing lower half part, and the inner casing lower half part are not fastened together by bolts to the state in which the outer casing upper half part, the inner casing upper half part, the outer casing lower half part, and the inner casing lower half part are fastened together by bolts.

Step B7

Temporary assembly of the bearings and the turbine rotor is performed. More specifically, the diaphragms are extracted from the inner casing lower half part, and the bearings and the turbine rotor are mounted to the inner casing lower half part.

Step B8

Centering of the turbine rotor is performed. More specifically, the installation position of the turbine rotor with respect to the bearings is adjusted.

Step B9

The turbine rotor is extracted from the inner casing lower half part, and the diaphragms are mounted to the inner casing lower half part.

Step B10

Alignment adjustment of the diaphragms is conducted. More specifically, taking into account the diaphragm displacement information gained based on the positional relationship of the diaphragms obtained in steps B4 and B6, the thickness of the position adjustment member such as a shim is adjusted, whereby the diaphragm installation position inside the inner casing is adjusted. That is, the diaphragms are previously moved and installed in a direction opposite the diaphragm displacement direction by an amount corresponding to the diaphragm displacement amount, whereby the displacement (movement) of the diaphragms when the outer casing upper half part, the inner casing upper half part, the outer casing lower half part, and the inner casing lower half part are fastened together by the bolts is canceled.

Step B11

The turbine rotor is mounted to the inner casing lower half part, and the diaphragm upper half parts are mounted to the diaphragm lower half parts. More specifically, the diaphragm upper half parts are detached from the diaphragm lower half parts, and the turbine rotor is mounted to the inner casing lower half part. Then, the diaphragm upper half parts are mounted to the diaphragm lower half parts.

Step B12

The width of the minute clearance between the alignment-adjusted diaphragms and the turbine rotor (hereinafter referred to as the clearance width as appropriate) is measured. More specifically, in the state in which the diaphragms have been alignment-adjusted, there is previously provided a lead wire in the portion where the clearance width is measured, for example, the seal region (the region where the seal portion is provided) of the diaphragms and the turbine rotor. Then, in the state in which the lead wire is provided, the turbine rotor is mounted to the casing lower half part, and the diaphragm upper half parts are mounted to the diaphragm lower half parts. At this time, the lead wire provided in the seal region is crushed, leaving the portion corresponding to the clearance width. Then, the diaphragm upper half parts are detached from the diaphragm lower half parts, and the turbine rotor is extracted from the casing lower half part to extract the lead wire, measuring the thickness of the portion of the lead wire that has remained without being crushed. This remaining portion corresponds to the clearance width. As a result, it is possible to accurately measure the clearance width. While in the present embodiment the clearance width is measured with the diaphragm upper half parts mounted to the diaphragm lower half parts, the clearance width may be measured without mounting the diaphragm upper half parts to the diaphragm lower half parts.

Step B13

The turbine rotor and the diaphragms are extracted from the inner casing lower half part. More specifically, the diaphragm upper half parts are detached from the diaphragm lower half parts, and the turbine rotor and the diaphragm lower half parts are extracted from the inner casing lower half part.

Step B14

Based on the clearance width measured in step B12, fine adjustment of the clearance width is conducted. More specifically, fine adjustment is performed on the height of the seal portion (seal fin) provided on the diaphragms and the turbine rotor, etc.

Step B15

Figure 6:
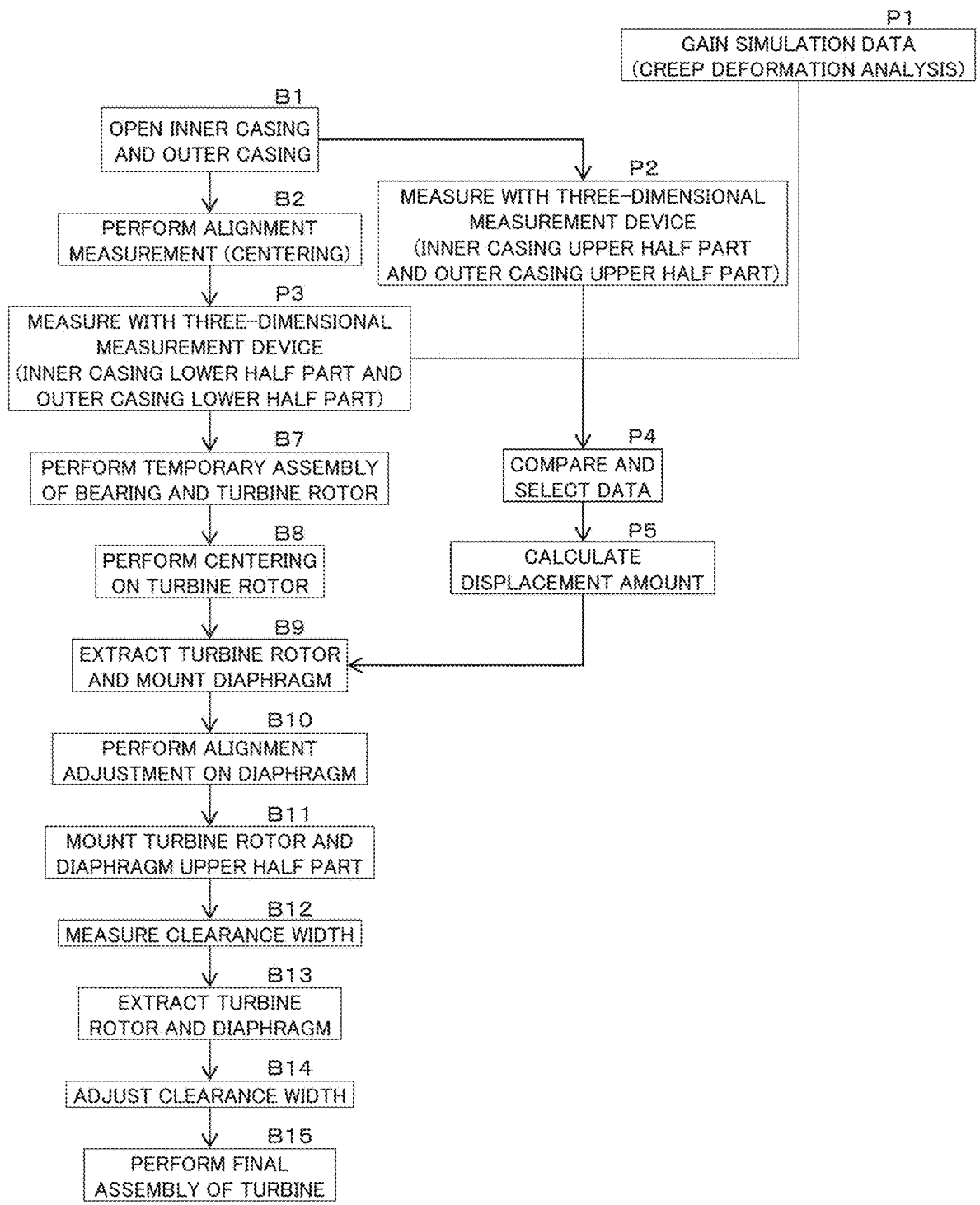
FIG. 6 is a flowchart illustrating the procedures of the assembling method of the first embodiment of the present invention.

The final assembly of the turbine is conducted. More specifically, the diaphragm lower half parts and the turbine rotor are mounted to the inner casing lower half part, and the diaphragm upper half parts are mounted to the diaphragm lower half parts. Then, the inner casing upper half part is placed on the inner casing lower half part to fasten them together by bolts, and the outer casing upper half part is placed on the outer casing lower half part to fasten them together by bolts 2-2. Assembling Method of the Present Embodiment FIG. 6 is a flowchart illustrating the procedures of the assembling method of the present embodiment. In FIG. 6, the steps that are the same as those of the flowchart shown in FIG. 5 are indicated by the same reference numerals, and a description thereof will be left out as appropriate. In the following, the assembling method according to the present embodiment will be described.

Step P1

Regarding a turbine model simulating the characteristics of the turbine to be assembled, simulation data on the configuration of the casing upper half part and the casing lower half part is gained through numerical analysis, and is stored in a storage device (not shown) as a database. More specifically, in the present embodiment, there is gained simulation data on the configuration of the outer casing upper half part 12 and the inner casing upper half parts 22 not fastened to the outer casing lower half part 11 and the inner casing lower half part 21, simulation data on the configuration of the outer casing lower half part 11 and the inner casing lower half part 21 in the state in which the outer casing upper half part 12, the inner casing upper half part 22, and the turbine rotor 3 are removed and in which the diaphragms 6 are mounted (hereinafter referred to as the open state as appropriate), and simulation data on the configuration of the outer casing upper half part 12, the inner casing upper half part 22, the outer casing lower half part 11, and the inner casing lower half part 21 in the state the outer casing upper half part 12, the inner casing upper half part 22, the outer casing lower half part 11, and the inner casing lower half part 21 are fastened together by bolts 13 from the open state. While in the present embodiment described above the present step is previously executed to store the simulation data as a database, there are no restrictions in particular regarding the time when the present step is executed so long as it is possible to store the simulation data as a database before step P4 described below is executed.

Of the high pressure turbine, the high/intermediate pressure turbine, the intermediate pressure turbine, and the low pressure turbine, the object of assembly of the present embodiment, in particular, is the inner casing and the outer casing of the high pressure turbine, the high/intermediate pressure turbine, and the intermediate pressure turbine, which are used under high temperature condition and subject to generation of high temperature creep deformation, and the time-dependent non-elastic deformation, mainly, the high temperature creep deformation accompanying a long-term operation of the turbine is evaluated. In the present embodiment, in evaluating the time-dependent non-elastic deformation, mainly, the high temperature creep deformation, there is adopted as the numerical analysis a high temperature creep deformation analysis by finite-element analysis, and there is employed power law creep including Norton-Bailey law, which exhibits high deformation approximation performance in the primary creep region of the material used for the components of the steam turbine (the casing, the turbine rotor, the diaphragms, etc.).

In the present embodiment, the values of the parameters including the temperature and pressure of the working fluid supplied to the turbine, the heat transfer rate between the working fluid and the casing, and the turbine operation time, and the parameters related to the material and configuration of the casing are varied using the turbine design conditions as a reference, and are input to the turbine model, whereby the simulation data on the configuration of the casing upper half part and the casing lower half part is gained. As a result, it is possible to gain simulation data on various modification patterns of the casing upper half part and the casing lower half part including simulation data, for example, on the configuration of the casing upper half part and the casing lower half part after a long-term operation of the turbine, and to turn it into a database.

Step P2

In step B1, the outer casing upper half part 12 is detached from the outer casing lower half part 11, and the inner casing upper half part 22 is removed from the inner casing lower half part 21, and then the configuration of the outer casing upper half part 12 and the inner casing upper half part 22 is measured and turned into data, thereby gaining measurement data. That is, there is gained measurement data on the configuration of the outer casing upper half part 12 and the inner casing upper half part 22 not fastened to the outer casing lower half part 11 and the inner casing lower half part 21. In the present embodiment, the inner casing and the outer casing of the existing actual machine are opened in step B1, and then the present step is executed in parallel with step B2.

In the present embodiment, by using a three-dimensional laser measurement device, the configuration of the outer casing upper half part 12 and the inner casing upper half part 22 is measured to gain measurement data. More specifically, the surface configuration of the outer casing upper half part 12 and the inner casing upper half part 22 is measured by the three-dimensional laser measurement device to gain a plurality of items of point data (point group data). Point group data is a collection of a large amount of coordinate information gained by a laser measurement device or the like. For example, it is data on a combination of a plurality of coordinates of the X-coordinate, the Y-coordinate, and the Z-coordinate. After removing noise from the point group data gained, this is turned into surface data (STL) to gain measurement data. When, as in the present embodiment, there is adopted a method in which the configuration of the outer casing and the inner casing by using a three-dimensional laser measurement device to gain measurement data, it is possible to measure the detailed configuration of the outer casing and the inner casing accurately in a shorter time as compared, for example, with the case where the worker manually measures the configuration of the outer casing and the inner casing by using a level gauge or the like.

While in the present embodiment the present step is executed in parallel with step B2, it is not always necessary to execute the present step in parallel with step B2 so long as it is completed before step P4 described below is executed. For example, the present step may be executed before step B2 or after step B2.

Step P3

In step B2, after performing the alignment adjustment measurement for the turbine rotor, the configuration of the outer casing lower half part 11 and the inner casing lower half part 21 in the state in which the outer casing upper half part 12 and the inner casing upper half part 22 are removed therefrom is measured and turned into data to gain measurement data. That is, measurement data on the configuration of the outer casing lower half part 11 and the inner casing lower half part 21 not fastened to the outer casing upper half part 12 and the inner casing upper half part 22 is gained. The procedures for gaining the measurement data on the configuration of the outer casing lower half part 11 and the inner casing lower half part 21 are the same as those for gaining the measurement data on the configuration of the outer casing upper half part 12 and the inner casing upper half part 22 described in step P2. When the present step is completed, step B7 is executed.

In the case where the measurement data on the outer casing and the inner casing of the operating actual machine is gained on the spot, it may occur that it is rather difficult to remove the heat insulating member provided on the outer side (outer peripheral surface side) of the outer casing lower half part 11, or that the inner casing lower half part 21 cannot be detached on account of the steps, making it impossible to measure the surface configuration of the casing lower half part. Thus, there can be cases where the measurement data on the configuration of the casing lower half part cannot be gained completely. Even in such cases, in order to compare the measurement data with the simulation data as described below, it is recommendable to gain the point group data as far as the measurement of the surface configuration of the casing lower half part is possible and to gain the measurement data.

Generally speaking, the diaphragms 6 are installed on the inner side of the horizontal joint flange surface of the inner casing lower half part 21, and, with respect to the displacement amount of the diaphragms 6, the influence of the change amount of the horizontal joint flange surface clearance when the outer casing upper half part 12 and the inner casing upper half part 22 are fastened to the outer casing lower half part 11 and the inner casing lower half part 21 is great. Thus, even in the case where solely detailed measurement data on the configuration around the horizontal joint flange surfaces of the outer casing lower half part 11 and the inner casing lower half part 21 is gained, it is possible to estimate (calculate) the displacement amount of the diaphragms 6 with high accuracy. Thus, when gaining the measurement data on the outer casing lower half part 11 and the inner casing lower half part 21, the object of measurement to be measured by the three-dimensional laser measurement device may be restricted to the portion around the horizontal joint flange surface of the outer casing lower half part 11 and the inner casing lower half part 21, gaining detailed measurement data on the configuration around the horizontal joint flange surface.

In the case where the surface configuration of the outer casing and the inner casing is measured by a three-dimensional laser measurement device in the state in which the outer casing and the inner casing are fastened together by the bolts 13, it may be difficult to measure a three-dimensional configuration around the horizontal joint flange surface in the case of the type of three-dimensional laser measurement device which scans the surface configuration while installed at an arbitrary position on the surface of the outer casing and the inner casing. There is a method in which, in order to reduce as much as possible the portion that cannot be measured, reference points are set at various positions on the surface of the outer casing and the inner casing and in which measurement is performed a number of times from a plurality of angles, connecting the measurement data together afterwards. In this method, however, it is rather difficult to overlap the measurement data, and there is the possibility of the accurate configuration of the outer casing and the inner casing not being gained. In view of this, it is advisable to adopt a method in which measurement is simultaneously performed by a plurality of three-dimensional laser measurement devices of the installation type and allowing interworking or a method which uses a portable three-dimensional laser measurement device that can get behind the bolts 13 or the like.

Step P4

The measurement data on the configuration of the casing upper half part and the casing lower half part gained in steps P2 and P3 and the simulation data on the configuration of the casing upper half part and the casing lower half part gained in step P1 are compared with each other, and one item of simulation data closest to the measurement data regarding the configuration of the casing upper half part and the casing lower half part is selected (the measurement data is evaluated). In the present embodiment, the comparison of the measurement data and the simulation data on the configuration of the casing upper half part and the casing lower half part is executed, using the open state as a reference. More specifically, the measurement data on the configuration of the outer casing upper half part 12, the inner casing upper half part 22, the outer casing lower half part 11, and the inner casing lower half part 21 in the state in which the outer casing upper half part 12 and the inner casing upper half part 22 have been removed from the outer casing lower half part 11 and the inner casing lower half part 21 is compared with the simulation data on the configuration of the outer casing upper half part 12 and the inner casing upper half part 22 not fastened to the outer casing lower half part 11 and the inner casing lower half part 21 and the simulation data on the configuration of the outer casing lower half part 11 and the inner casing lower half part 21 in the open state, and there is selected the simulation data closest to the measurement data on the configuration of the outer casing upper half part 12, the inner casing upper half part 22, the outer casing lower half part 11, and the inner casing lower half part 21 in the state in which the outer casing upper half part 12 and the inner casing upper half part 22 have been removed from the outer casing lower half part 11 and the inner casing lower half part 21. In the present embodiment, the measurement data is gained in steps P2 and P3, and then the present step is executed in parallel with step B7.

The evaluation of the measurement data may be conducted, for example, by a method in which the measurement data on the configuration of the casing upper half part and the casing lower half part gained in steps P2 and P3 is directly compared with the simulation data on the configuration of the casing upper half part and the casing lower half part gained in step P1, with selection being made based on the degree of inclination of the flange portions 15 and 16 with respect to the contact surface 10, or a method in which there is obtained the difference between the measurement data on the configuration of the casing upper half part and the casing lower half part gained in steps P2 and P3 and the CAD data under the design condition and in which there is obtained the difference between the simulation data on the configuration of the casing upper half part and the casing lower half part gained in step P1 and the CAD data under the design condition, with the resultant differences being compared with each other for selection. The method of evaluating the measurement data is not restricted to the above-mentioned ones so long as it is possible to select simulation data closest to the measurement data on the configuration of the casing upper half part and the casing lower half part gained in steps P2 and P3.

While in the present embodiment described above the present step is executed in parallel with step B7, it is not always necessary to execute the present step in parallel with step B7. For example, the present step may be executed before step B7.

Step P5

Based on the simulation data selected in step P4, there is calculated the change amount of the configuration of the casing upper half part and the casing lower half part when the casing upper half part is fastened to the casing lower half part in the open state by the bolts 13. More specifically, there is calculated the change amount of the configuration of the casing upper half part and the casing lower half part when the casing upper half part is fastened to the casing lower half part in the open state by the bolts 13 based on the following simulation data: the simulation data on the configuration of the outer casing upper half part 12 and the inner casing upper half part 22 not fastened to the outer casing lower half part 11 and the inner casing lower half part 21; the simulation data on the configuration of the outer casing lower half part 11 and the inner casing lower half part 21 in the open state; and the simulation data on the configuration of the outer casing upper half part 12, the inner casing upper half part 22, the outer casing lower half part 11, and the inner casing lower half part 21 in the state in which the outer casing upper half part 12 and the inner casing upper half part 22 are fastened to the outer casing lower half part 11 and the inner casing lower half part 21 from the open state by the bolts 13. Then, based on the change amount calculated, there is calculated the adjustment amount with respect to the installation position of the diaphragms 6. In the present embodiment, the adjustment amount regarding the installation position of the diaphragms 6 is calculated in step P4, and then the present step is executed in parallel with step B8.

In the present embodiment, in step P4, the measurement data and the simulation data on the configuration of the casing upper half part and the casing lower half part are compared with each other, and one item of simulation data closest to the measurement data with respect to the configuration of the casing upper half part and the casing lower half part is selected. However, a plurality of items of simulation data closest to the measurement data with respect to the configuration of the casing upper half part and the casing lower half part may be selected. In this case, there may be calculated the change amount of the configuration of the casing upper half part and the casing lower half part when the casing upper half part is fastened to the casing lower half part approximately in the open state by the bolts 13 from the plurality of items of simulation data.

While in the present embodiment there is calculated the change amount of the configuration of the casing upper half part and the casing lower half part when the casing upper half part is fastened to the casing lower half part in the open state by the bolts 13, the change amount of the configuration of the casing upper half part and the casing lower half part when the casing upper half part is fastened to the casing lower half part in the open state by the bolts 13 may also be stored in the storage device in relation to the simulation data.

Further, while in the present embodiment described above the present step is executed in parallel with step B8, it is not always necessary for the present step to be executed in parallel with step B8. For example, the present step may be executed before step B8.

After the present step is completed, there is adjusted in step B9 the installation position of the diaphragms 6 inside the casing taking into account the adjustment amount regarding the installation position of the diaphragms 6 calculated based on the change amount of the configuration of the casing upper half part and the casing lower half part. After this, steps B10 through B14 are executed, and the final assembly of the turbine is conducted in step B15.

(Effect)

(1) In the present embodiment, the measurement data on the configuration of the casing upper half part not fastened to the casing lower half part and the measurement data on the configuration of the casing lower half part in the open state in which the casing upper half part and the turbine rotor are removed and the diaphragms are mounted are compared with the simulation data on the configuration of the casing upper half part and the casing lower half part previously obtained through numerical analysis, and the simulation data closest to the measurement data with respect to the configuration of the casing upper half part and the casing lower half part is selected. Based on the selected simulation data, the change amount of the configuration of the casing upper half part and the casing lower half part when the casing upper half part is fastened to the casing lower half part in the open state by the bolts is calculated, making it possible to gain the displacement information on the diaphragms 6 when the casing upper half part is fastened to the casing lower half part by the bolts. Thus, it is possible to gain the displacement information on the diaphragms 6 when the casing upper half part is fastened to the casing lower half part by the bolts while reducing the operations of steps B3 through B6 of the conventional assembling method, that is, the operations of performing the temporary assembly by fastening the inner casing and the outer casing by the bolts, performing the measurement of the diaphragms for alignment adjustment, detaching the bolts fastening the inner casing and the outer casing to each other, performing the measurement of the diaphragms for alignment adjustment, and gaining the displacement information on the diaphragms when the outer casing and the inner casing are fastened together by the bolts solely to the operation of step P3, that is, the operation of gaining the measurement data on the configuration of the casing lower half part in the open state. Thus, in the present embodiment, it is possible to maintain the accuracy in the positional adjustment for the diaphragms 6 while omitting the temporary assembly of the casing to shorten the turbine assembly period.

(2) In a kind of turbine assembling method, based on the measurement result of the diaphragm installation position in the state in which there is only the casing lower half part, the installation position of each component of the turbine is calculated and adjusted based on an empirical rule. In this method, however, the offset value is predicted based on the relative height of the support position of the diaphragms with respect to the casing lower half part to adjust the height of the support position of the diaphragms. Thus, of the high pressure turbine, the high/intermediate pressure turbine, the intermediate pressure turbine, and the low pressure turbine, when the object of assembly is a turbine which is used under a high temperature condition and of which the non-elastic deformation is not negligible as in the case, in particular, of the high pressure turbine, the high/intermediate pressure turbine, and the intermediate pressure turbine, it is difficult to accurately predict the displacement amount of the support position due to the non-elastic deformation.

Figure 7:
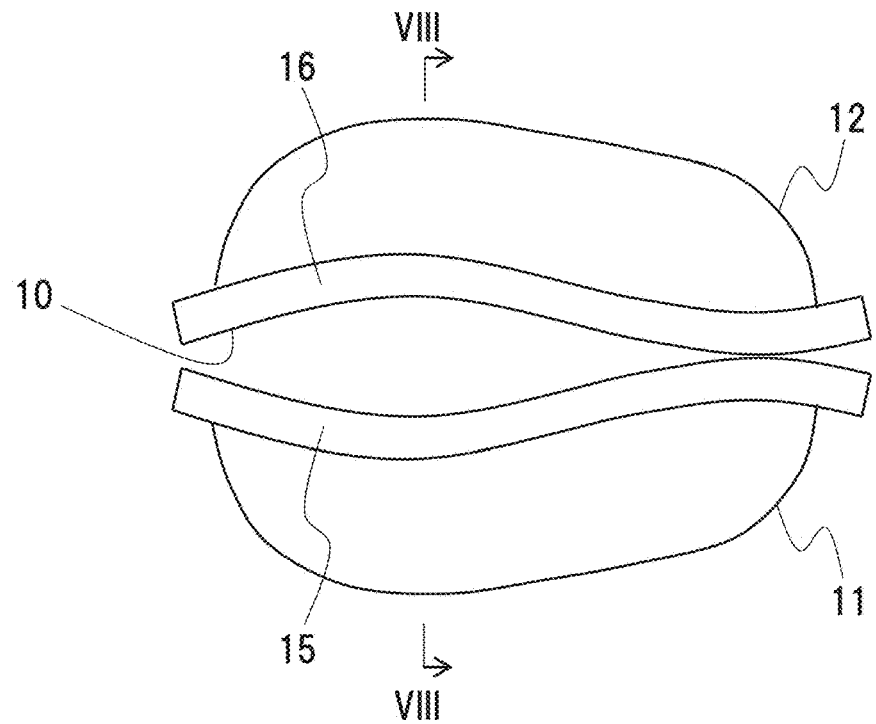
FIG. 7 is a side view of the casing of the steam turbine after a long-term operation.
Figure 8:
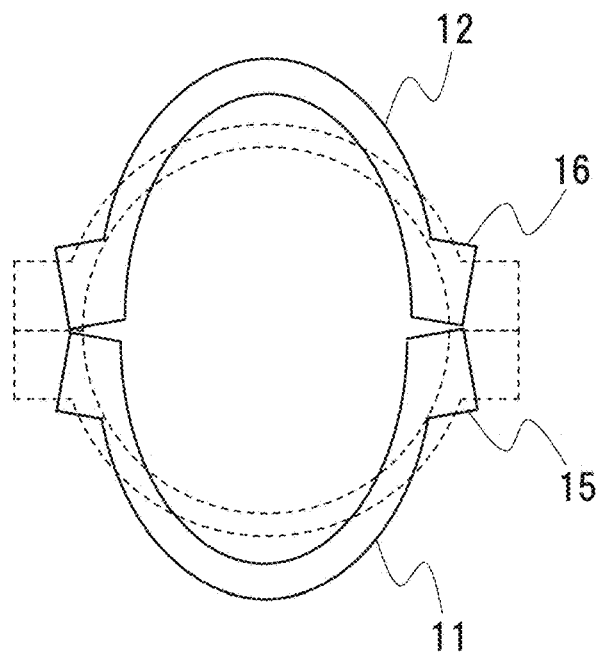
FIG. 8 is an arrow line sectional view taken along the arrow line VIII-VIII of FIG. 7.

FIG. 7 is a side view of the casing of the steam turbine after a long-term operation, and FIG. 8 is an arrow line sectional view taken along the arrow line VIII-VIII of FIG. 7.

Of the high pressure turbine, the high/intermediate pressure turbine, the intermediate pressure turbine, and the low pressure turbine, the casings of, in particular, the high pressure turbine, the high/intermediate pressure turbine, and the intermediate pressure turbine are exposed to a steam of high temperature and high pressure. Thus, as shown in FIGS. 7 and 8, in the casings of the high pressure turbine, the high/intermediate pressure turbine, and the intermediate pressure turbine, there is generated a non-elastic deformation, mainly a high temperature creep deformation as a result of a long term operation. In some cases, in the open state, the contact surfaces 10 of the flange portions 15 and 16 undergo deformation such that the contact surfaces 10 undulate. Generally speaking, the high temperature creep deformation exhibits a complicated behavior due to factors such as the turbine operation time, the working fluid temperature, and variation in the casing material. Even in the case of turbines of the same design, an individual difference can be generated, so that it is difficult to accurately predict the displacement amount of the support position of the diaphragms based on the evaluation by an empirical rule.

When the non-elastic deformation, mainly the above-mentioned high temperature creep deformation, is to be accurately evaluated, it is ideal to accurately measure the three-dimensional configuration of the casing on the spot by using a three-dimensional scanner or the like, gain the measurement data on the configuration, and finally execute bolt re-fastening analysis based on finite-element analysis to calculate the displacement amount of the installation position of each component due to the assembly of the casing. It involves, however, problems in terms of technique and time to perform the step of preparing and evaluating a numerical analysis model from the configuration measurement data in parallel with other steps on the spot. Further, a heat insulating member is strictly mounted to the casing lower half part of the turbine installed on the spot, and, in some cases, it is difficult to gain complete measurement data on the configuration of the casing. Thus, it is not always possible to adopt the above-mentioned method.

In contrast, in the present embodiment, creep deformation analysis based on the finite-element method is performed on a turbine model simulating the characteristics of the turbine, and the values of parameters including the temperature of the working fluid supplied to the turbine, the heat transfer rate between the working fluid and the casing, and the turbine operation time are varied using the turbine design condition as a reference and input to the turbine model, thereby gaining the simulation data on the configuration of the casing upper half part and the casing lower half part. Then, the measurement data on the configuration of the casing upper half part not fastened to the casing lower half part and the measurement data on the configuration of the casing lower half part in the open state are compared with the above-mentioned simulation data, and the simulation data closest to the measurement data with respect to the configuration of the casing upper half part and the casing lower half part is selected, and, based on the simulation data selected, there is calculated the change amount of the configuration of the casing upper half part and the casing lower half part when the casing upper half part is fastened to the casing lower half part in the open state by the bolts. Thus, there is no need to perform the step of preparing and evaluating the numerical analysis model from the configuration measurement data on the spot in parallel with other operations. Further, even in the case where it is difficult to remove the casing lower half part of the steam turbine installed on the spot, if it is possible to gain, as much as possible, measurement data on the configuration of the casing lower half part, it can be compared with the simulation data, making it possible to calculate the change amount of the configuration of the casing upper half part and the casing lower half part when the casing upper half part is fastened to the casing lower half part in the open state by the bolts. Thus, in the present embodiment, even in the case where the object of assembly is a turbine which is used under high temperature condition and of which the non-elastic deformation is not negligible as in the case of the high pressure turbine, the high/intermediate pressure turbine, and the intermediate pressure turbine, it is possible to accurately gain the diaphragm displacement information.

(3) In the present embodiment, the surface configuration of the casing upper half part and the casing lower half part is measured by a three-dimensional laser measurement device to gain a plurality of items of point data, and the plurality of point data are turned into surface data to gain the measurement data on the configuration of the casing upper half part and the casing lower half part. The data thus gained is compared with the simulation data, thereby calculating the change amount of the configuration of the casing upper half part and the casing lower half part when the casing upper half part is fastened to the casing lower half part in the open state by the bolts. Thus, it is possible to avoid generation of variation in the measurement accuracy in the diaphragm moving amount due to a difference in skill level of the measurement workers, making it possible to maintain the accuracy in the diaphragm positional adjustment. Further, in the present embodiment, there is no need for the measurement worker to enter the turbine, so that the embodiment is also applicable to a small turbine, etc.

(4) Generally speaking, a turbine has a large number of components, and many points (items) to be evaluated. Further, it requires high accuracy and is complicated, so that, in the conventional analysis system, it is difficult to gain simulation data or the like on the configuration of the turbine components such as the casing, the turbine rotor, and the diaphragms. As a result of an improvement in the analysis system, etc., however, in the present embodiment, simulation data on the configuration of the components of the turbine is gained by using an analysis system, and is applied to the method of assembling a turbine. This also contributes to a reduction in the turbine assembly period and to the maintenance of the accuracy in the diaphragm positional adjustment.

Second Embodiment

Figure 9:
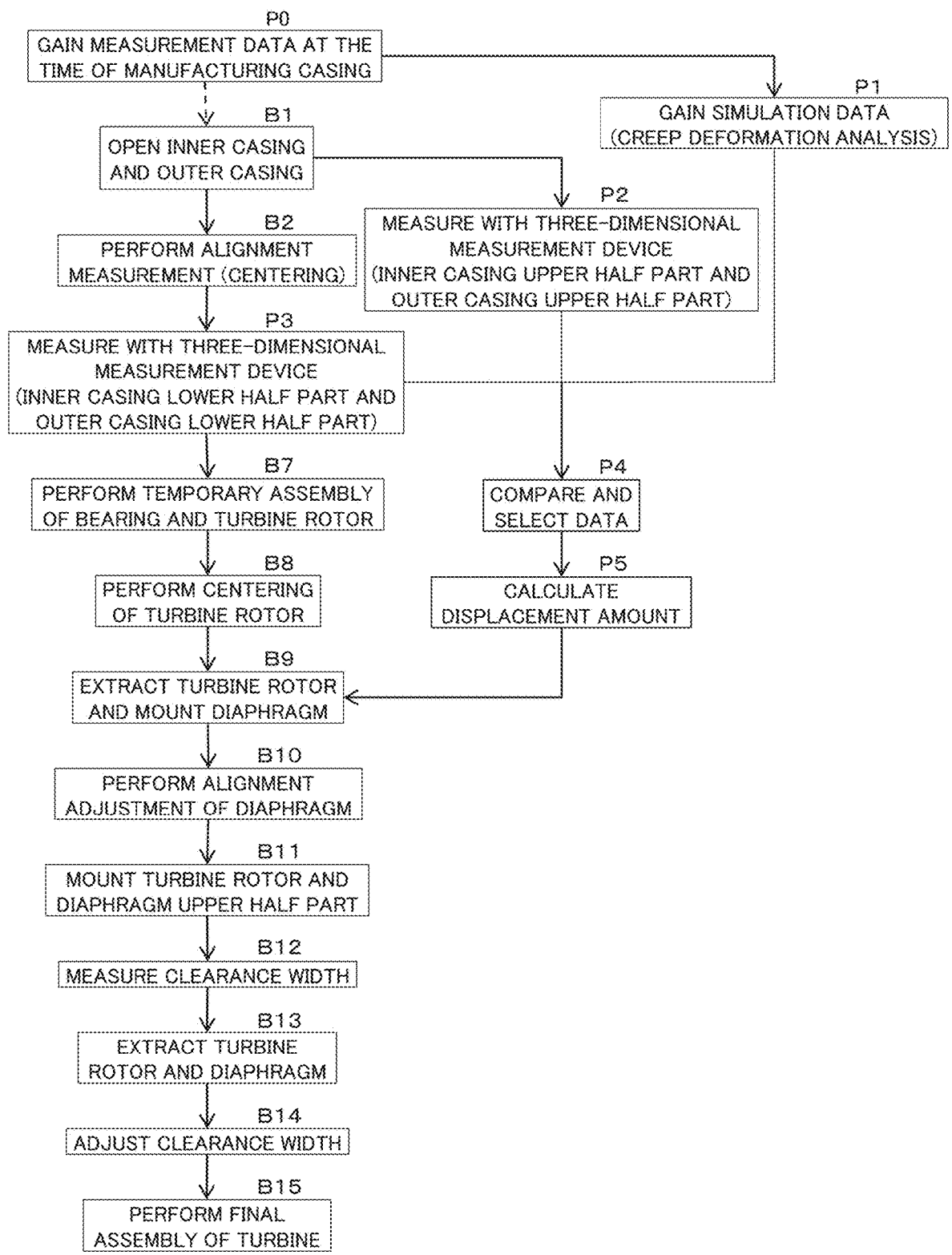
FIG. 9 is a flowchart illustrating the procedures of an assembling method according to a second embodiment of the present invention.

FIG. 9 is a flowchart illustrating the procedures of the assembling method according to the present embodiment. In FIG. 9, the steps that are the same as those of the flowchart shown in FIG. 6 are indicated by the same reference numerals, and a description thereof will be left out as appropriate. In the following, the assembling method of the present embodiment will be described.

The method of assembling a turbine according to the present embodiment differs from the turbine assembling method of the first embodiment in that there is further provided step P0. Otherwise, the turbine assembling method is the same as the turbine assembling method of the first embodiment.

Step P0

Measurement data on the configuration of the casing upper half part and the casing lower half part at the time of the manufacturing thereof is gained, and the gained measurement data on the configuration of the casing upper half part and the casing lower half part at the time of the manufacturing thereof is reflected in the turbine model. More specifically, as in the case of the procedures for gaining measurement data on the configuration of the casing upper half part and the casing lower half part in steps P2 and P3, measurement data on the configuration of the casing upper half part and the casing lower half part at the time of manufacturing thereof is measured by a three-dimensional laser measurement device. That is, the surface configuration of the casing upper half part and the casing lower half part at the time of manufacturing thereof is measured by the three-dimensional laser measurement device to gain a plurality of items of point data, and, after removing noise from the point group data gained, the data is turned into surface data, thus gaining the measurement data.

In the present embodiment, the present step is executed before executing step P1. It is recommendable to execute the present step, for example, at the inspection stage, which is conducted after the production (completion) of the casing. Unlike the operating actual machine on the spot, at this stage, no heat insulating member or piping is provided on the outer side of the casing, and it is possible to gain complete measurement data on the configuration of the casing upper half part and the casing lower half part. So long as it is executed before step P1, it is not always necessary for the present step to be executed at the inspection stage. For example, the present step may be introduced to the stage where the configuration of the product in the form of a supplied casting before machining, using the measurement data for the inspection of the configuration. Usually, the dimensional accuracy of the machined portion is sufficiently higher than that of the casing surface portion (the surface portion of the casting), so that the influence on the accuracy in the numerical analysis in step P1 is small. Thus, the design configuration is employed for the machined surface of the casing inner surface machined after the inspection.

In addition to the effect that is the same as hat of the first embodiment, the present embodiment provides the following effect.

Generally speaking, of the high pressure turbine, the high/intermediate pressure turbine, the intermediate pressure turbine, and the low pressure turbine, the casing, in particular, of the high pressure turbine, the high/intermediate pressure turbine, and the intermediate pressure turbine, is produced as a large-sized integral casting. Basically, a large-sized integral casting is often produced while securing an excessive thickness with respect to the design condition. For example, when the wall thickness of the casing of the design condition is approximately 100 mm, the casting may be produced thicker than that by 10 mm or more. Thus, there are cases where the influence on the rigidity of the casing due to the securing of an excessive thickness is not negligible.

In contrast, in the present embodiment, there is gained measurement data on the configuration of the casing upper half part and the casing lower half part at the time of manufacturing thereof, and numerical analysis is conducted with the gained measurement data on the configuration of the casing upper half part and the casing lower half part at the time of manufacturing thereof being reflected in the turbine model, whereby simulation data is gained. Thus, it is possible to gain simulation data taking into account the influence of the securing of an excessive thickness on the rigidity of the casing, thus making it possible to achieve an improvement in terms of the estimation accuracy for the diaphragm displacement information as compared with the first embodiment. Further, by using the measurement data on the configuration at the time of the manufacturing of the casing upper half part and the casing lower half part at the inspection stage, it is easier to perform dimensional comparison between the measurement data and the CAD data under the design condition, making it possible to easily execute dimensional inspection on the casing, which is a large casting structure. This has been difficult in the prior art.

Third Embodiment

Figure 10:
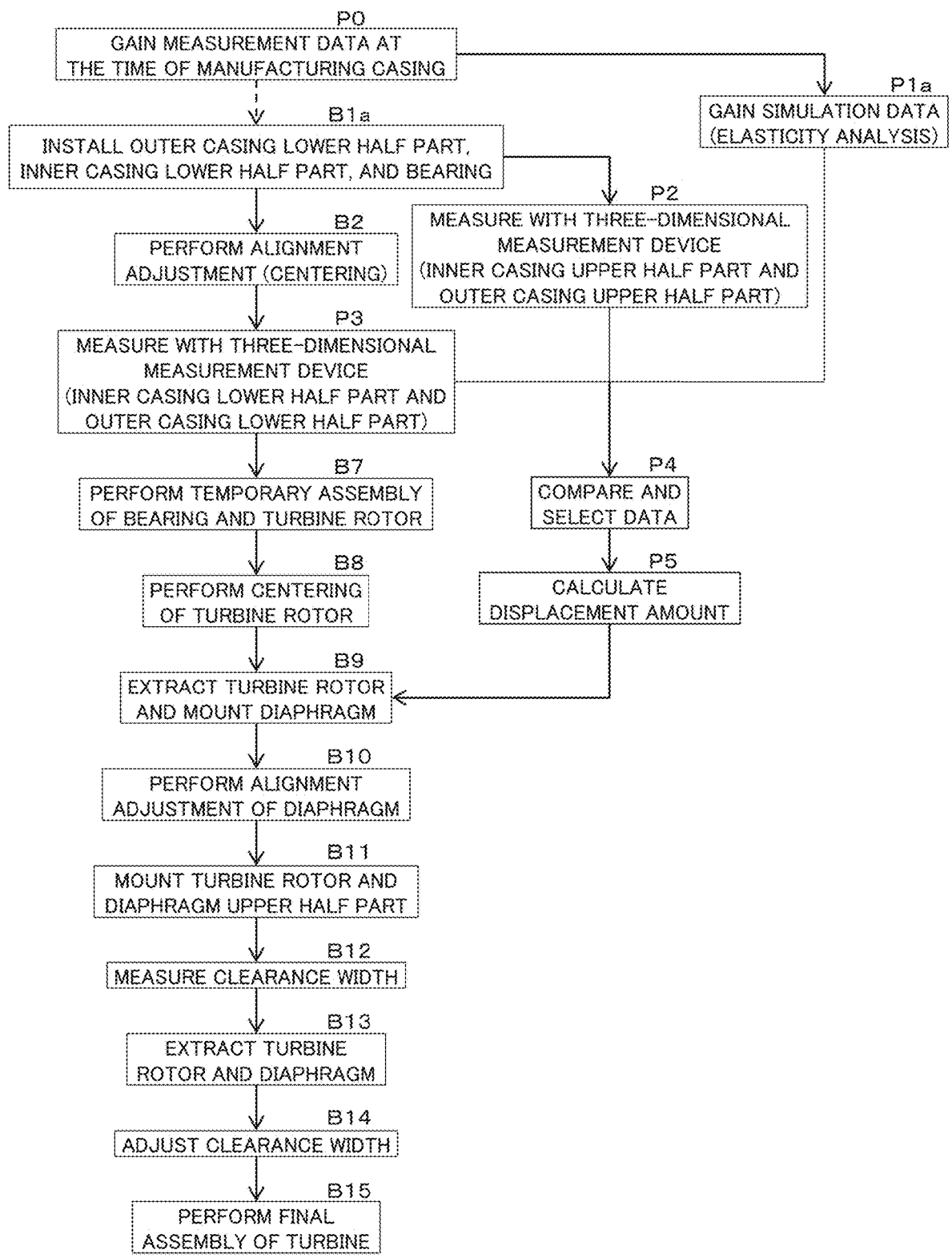
FIG. 10 is a flowchart illustrating the procedures of an assembling method according to a third embodiment of the present invention.

FIG. 10 is a flowchart illustrating the procedures of the assembling method of the present embodiment. In FIG. 10, the steps that are the same as those of the flowchart shown in FIG. 9 are indicated by the same reference numerals, and a description thereof will be left out as appropriate. In the following, the assembling method of the present embodiment will be described.

The present embodiment is applicable when installing a steam turbine at the time of construction of an electric power plant equipped with a steam turbine. More specifically, the assembling method of the present embodiment differs from the assembling method of the second embodiment in that step B1a is provided instead of step B1 and that step P1a is provided instead of step P1. Otherwise, the assembling method is the same as the assembling method according to the second embodiment.

Step B1a

There are installed the outer casing lower half part 11, the inner casing lower half part 21, and the bearings. More specifically, the outer casing lower half part 11 is installed, and the inner casing lower half part 21 is installed in the outer casing lower half part 11. Then, the bearings are installed in the inner casing lower half part 21. After the completion of the present step, step B2 and step P2 are executed.

Step P1a

With respect to a turbine model simulating the characteristics of the turbine constituting the object of assembly, simulation data on the configuration of the casing upper half part and the casing lower half part is gained through numerical analysis, and is stored in the storage device as a database. More specifically, in the present embodiment, there are gained simulation data on the configuration of the outer casing and the inner casing not fastened together by the bolts 13 and simulation data on the configuration of the outer casing and the inner casing fastened together by the bolts 13.

In the present embodiment, the inner casing and the outer casing of the high pressure turbine, the high/intermediate pressure turbine, the intermediate pressure turbine, and the low pressure turbine constitute the object of assembly, and the elastic deformation of the inner casing and the outer casing is evaluated. In evaluating the elastic deformation, there is adopted, as the numerical analysis, elastic analysis based on finite-element analysis. Further, in the present embodiment, the values of parameters including the material constant of the casing upper half part and the casing lower half part are varied using the design condition of the turbine as a reference, and input to the turbine model, thereby gaining simulation data on the configuration of the casing upper half part and the casing lower half part. As a result, it is possible to gain simulation data on various deformation patterns including, for example, simulation data on the configuration of the outer casing and the inner casing not fastened together by the bolts and simulation data on the configuration of the outer casing and the inner casing fastened together by the bolts, and store the data as a database.

After the completion of steps P1a, P2, and P3, in step P4, the measurement data on the configuration of the casing upper half part and the casing lower half part gained in steps P2 and P3 is compared with the simulation data on the configuration of the casing upper half part and the casing lower half part gained in step P1a, and, with respect to the configuration of the casing upper half part and the casing lower half part, one item of simulation data closest to the measurement data is selected, and, in step P5, there is calculated the change amount of the configuration of the casing upper half part and the casing lower half part when the casing upper half part is fastened to the casing lower half part in the open state by the bolts 13 based on the simulation data selected in step P4. After this, steps B9 through B14 are executed, and the final assembly of the turbine is conducted in step B15.

In the present embodiment, there is executed step P0 in which the measurement data on the configuration of the casing upper half part and the casing lower half part at the time of manufacturing the same is gained, and in which the gained measurement data on the configuration of the casing upper half part and the casing lower half part at the time of manufacturing the same is reflected in the turbine model. Step P0, however, may be omitted.

In the present embodiment, in addition to the same effect as that of the second embodiment, it is possible to attain the following effect.

The present embodiment is also applicable when the steam turbine is installed at the time of construction of an electric power plant equipped with a steam turbine. In this case also, it is possible to maintain the accuracy in the positional adjustment of the diaphragms 6 while shortening the turbine assembly period through the omission of the temporary assembly of the casing.

Fourth Embodiment

Figure 11:
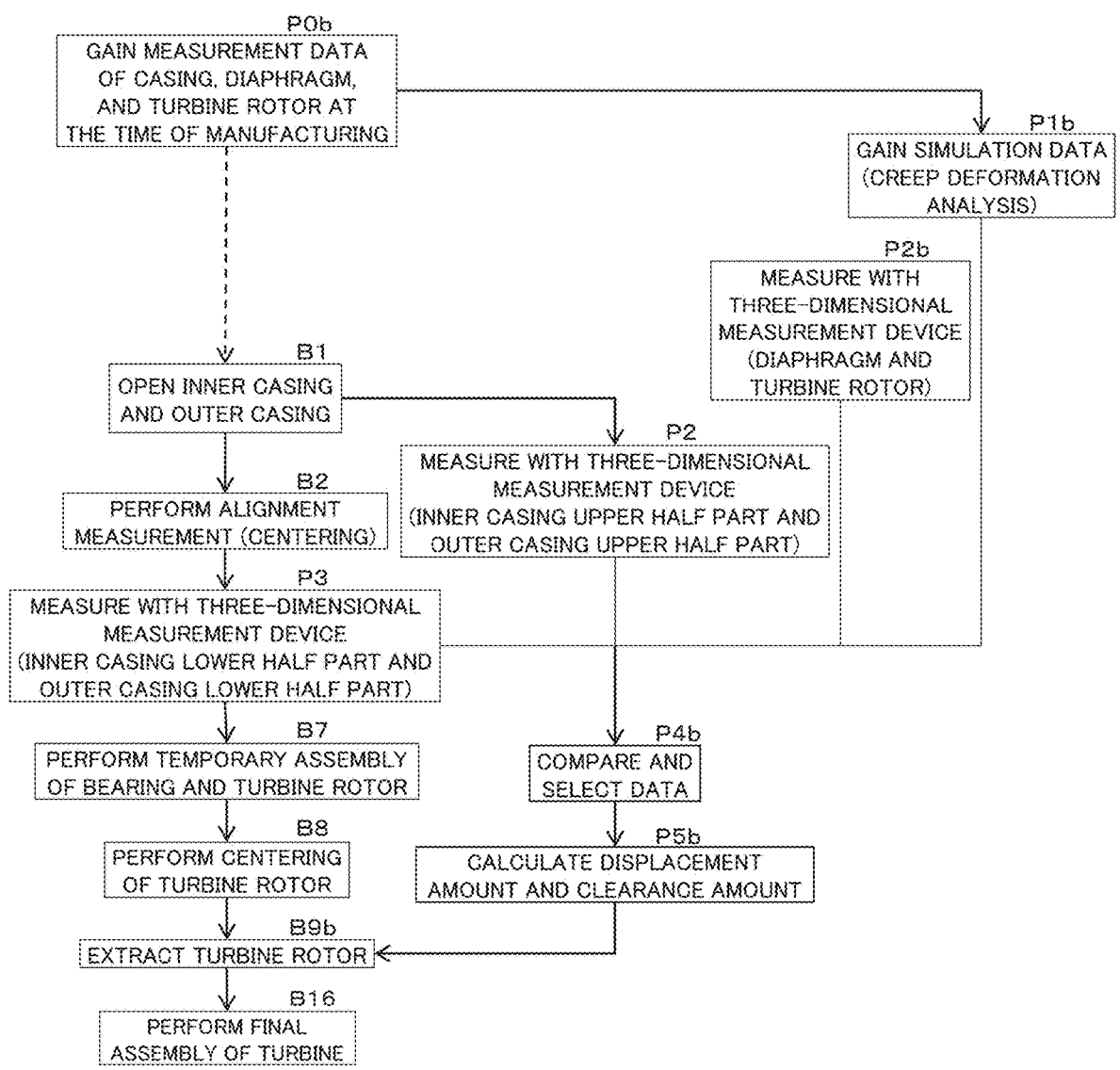
FIG. 11 is a flowchart illustrating the procedures of an assembling method according to a fourth embodiment of the present invention.

FIG. 11 is a flowchart illustrating the procedures of the assembling method of the present embodiment. In FIG. 11, the steps that are the same as those of the flowchart shown in FIG. 9 are indicated by the same reference numerals, and a description thereof will be left out as appropriate. In the following, the assembling method of the present embodiment will be described.

In the present embodiment, simulation data and measurement data are gained not only on the casing upper half part and the casing lower half part but also on the diaphragms 6 and the turbine rotor 3. From the measurement data and the simulation data gained, there is calculated the clearance width of the diaphragms 6 and the turbine rotor 3, and the installation position of the diaphragms 6 inside the casing is adjusted further taking into account the clearance width calculated. More specifically, the assembling method of the present embodiment differs from the assembling method of the second embodiment in that step P0*b* is provided instead of step P0, that step P1*b* is provided instead of step P1, that step P4*b* is provided instead of step P4, that step P5*b* is provided instead of step P5, that step B9*b* is provided instead of step B9, and that there is further provided step P2*b*. Otherwise, the assembling method is the same as the turbine assembling method according to the second embodiment.

Step P0*b*

In addition to the configuration measurement data at the time of the manufacturing of the casing upper half part and the casing lower half part, there is gained configuration measurement data at the time of the manufacturing of the diaphragms 6 and the turbine rotor 3, and the configuration measurement data at the time of the manufacturing of the diaphragms 6 and the turbine rotor 3 is reflected in the turbine model. As in step P0 of the assembling method of the second embodiment, in the present embodiment, the configuration measurement data at the time of the manufacturing of the diaphragms 6 and the turbine rotor 3 is gained by using a three-dimensional laser measurement device. That is, the surface configuration at the time of the manufacturing of the diaphragms 6 and the turbine rotor 3 is measured by the three-dimensional laser measurement device to again a plurality of items of point data. After removing noise from the gained point group data, the data is turned into surface data to gain the measurement data.

Step P1*b*

Through numerical analysis previously prepared with respect to the turbine model simulating the characteristics of the turbine constituting the object of assembly, there is gained, in addition to simulation data on the configuration of the casing upper half part and the casing lower half part, simulation data on the configuration of the diaphragms 6 and the turbine rotor 3, and the data gained is stored in the storage device as a database. In the present embodiment, there is gained simulation data on the configuration of the diaphragms 6 and the turbine rotor 3 not mounted to the casing lower half part and simulation data on the configuration of the diaphragms 6 and the turbine rotor 3 mounted to the casing lower half part.

Step P2*b*

There is gained measurement data on the configuration of the diaphragms 6 and the turbine rotor 3 not mounted to the casing lower half part. In the present embodiment, the present step is executed in parallel with step P2. As in step P2, the measurement data on the configuration of the diaphragms 6 and the turbine rotor 3 is gained by using a three-dimensional laser measurement device. More specifically, the surface configuration of the diaphragms 6 and the turbine rotor 3 is measured by using the three-dimensional laser measurement device to gain a plurality of items of point data. After removing noise from the data gained, the data is turned into surface data to thereby gain the measurement data.

Step P4*b*

The measurement data on the configuration of the casing upper half part, the casing lower half part, the diaphragms 6, and the turbine rotor 3 gained in steps P2, P2*b*, and P3 is compared with the simulation data on the configuration of the casing upper half part, the casing lower half part, the diaphragms 6, and the turbine rotor 3 gained in step P1*b*, and one item of simulation data closest to the measurement data with respect to the configuration of the casing upper half part, the casing lower half part, the diaphragms 6, and the turbine rotor 3 is selected.

Step P5*b*

Based on the simulation data selected in step P4, in addition to the change amount of the configuration of the casing upper half part and the casing lower half part when the casing upper half part is fastened to the casing lower half part in the open state by the bolts 13, there is calculated the clearance width between the diaphragms 6 and the turbine rotor 3 when the diaphragms 6 and the turbine rotor 3 are mounted to the casing lower half part from simulation data on the configuration of the diaphragms 6 and the turbine rotor 3 not mounted to the casing lower half part and simulation data on the configuration of the diaphragms 6 and the turbine rotor 3 mounted to the casing lower half part, and the adjustment amount regarding the installation position of the diaphragms 6 is calculated based on the change amount and the clearance width calculated.

While in the present embodiment the clearance width between the diaphragms 6 and the turbine rotor 3 when the diaphragms 6 and the turbine rotor 3 are mounted to the casing lower half part is calculated, the clearance width between the diaphragms 6 and the turbine rotor 3 when the diaphragms 6 and the turbine rotor 3 are mounted to the casing lower half part may also be stored in the storage device while related to the simulation data.

Step B9*b*

The turbine rotor 3 is extracted from the inner casing lower half part. Thereafter, in step B16, the installation position of the diaphragms 6 inside the casing is adjusted taking into account the change amount and the clearance width calculated in step P5*b*, and the final assembly of the turbine is conducted.

In addition to the same effect as that of the second embodiment, the present embodiment provides the following effect.

In the present embodiment, it is possible to calculate the clearance width between the diaphragms 6 and the turbine rotor 3 when the diaphragms 6 and the turbine rotor 3 are mounted to the casing lower half part from simulation data on the configuration of the diaphragms 6 and the turbine rotor 3 not mounted to the casing lower half part and simulation data on the configuration of the diaphragms 6 and the turbine rotor 3 mounted to the casing lower half part. Thus, in addition to the operations of steps B3 through B6 of the conventional assembling method, it is also possible to omit the operations of steps B10 through B14, that is, the operation of measuring the clearance of the seal portion by using a lead wire. As a result, it is possible to further shorten the turbine assembly period.

Fifth Embodiment

It is also possible to realize the turbine assembling method according to the present invention as an assembly work supporting system. In the following, the case will be described where the turbine assembling method according to the present invention is realized as an assembly work supporting system.

Figure 12:
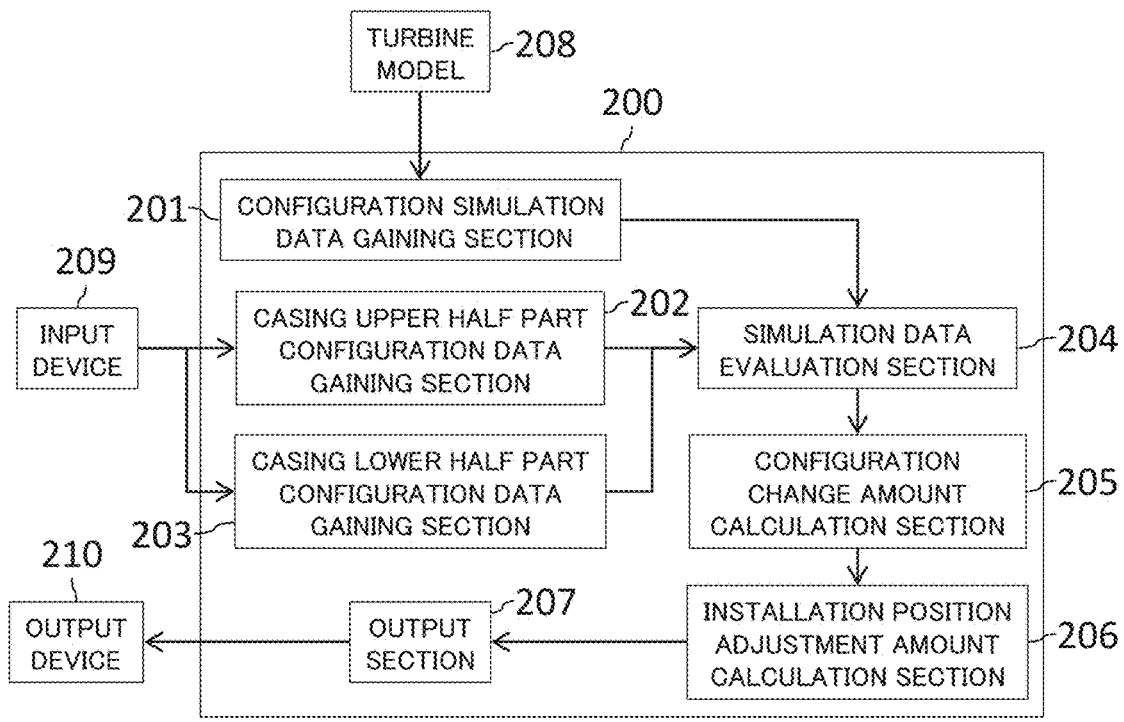
FIG. 12 is a diagram illustrating function blocks of an assembly work supporting system according to a fifth embodiment of the present invention.

FIG. 12 is a diagram illustrating function blocks of an assembly work supporting system according to the present embodiment. As shown in FIG. 12, an assembly work supporting system 200 according to the present embodiment is equipped with a configuration simulation data gaining section 201, a casing upper half part configuration data gaining section 202, a casing lower half part configuration data gaining section 203, a simulation data evaluation section 204, a configuration change amount calculation section 205, an installation position adjustment amount calculation section 206, and an output section 207.

The configuration simulation data gaining section 201 serves to gain simulation data on the configuration of the casing upper half part and the casing lower half part obtained through numerical analysis based on a turbine model 208. More specifically, in the present embodiment, the configuration simulation data gaining section 201 is electrically connected to the turbine model 208, and gains simulation data on the configuration of the outer casing upper half part 12 and the inner casing upper half part 22 not fastened to the outer casing lower half part 11 and the inner casing lower half part 21, simulation data on the configuration of the outer casing lower half part 11 and the inner casing lower half part 21 in the open state, and simulation data on the configuration of the outer casing upper half part 12, the inner casing upper half part 22, the outer casing lower half part 11, and the inner casing lower half part 21 in the state in which the outer casing upper half part 12, the inner casing upper half part 22, the outer casing lower half part 11, and the inner casing lower half part 21 are fastened together by the bolts 13 from the open state.

The casing upper half part configuration data gaining section 202 serves to gain measurement data on the configuration of the casing upper half not fastened to the casing lower half. More specifically, in the present embodiment, the casing upper half part configuration data gaining section 202 is electrically connected to an input device 209. After removing the outer casing upper half part 12 from the outer casing lower half part 11, and after removing the inner casing upper half part 22 from the inner casing lower half part 21, the configuration of the outer casing upper half part 12 and the inner casing upper half part 22 is measured and turned into data, which is input via the input device 209 and is gained as the measurement data. The input device 209 serves to gain measurement data on the configuration of the casing upper half part and the casing lower half part. For example, it may be a three-dimensional laser measurement device or an apparatus connected to the three-dimensional laser measurement device.

The casing lower half part configuration data gaining section 203 serves to gain measurement data on the configuration of the casing lower half part in the open state. More specifically, in the present embodiment, the casing lower half part configuration data gaining section 203 is electrically connected to the input device 209. After the alignment adjustment measurement for the turbine rotor, the configuration of the outer casing lower half part 11 and the inner casing lower half part 21 with the outer casing upper half part 12 and the inner casing upper half part 22 being removed therefrom is measured and turned into data, which is input via the input device 209, and is gained as the measurement data.

The simulation data evaluation section 204 compares the measurement data on the configuration of the casing upper half part and the casing lower half part with the simulation data on the configuration of the casing upper half part and the casing lower half part, and selects simulation data closest to the measurement data with respect to the configuration of the casing upper half part and the casing lower half part. More specifically, in the present embodiment, the simulation data evaluation section 204 is electrically connected to the configuration simulation data gaining section 201, the casing upper half part configuration data gaining section 202, and the casing lower half part configuration data gaining section 203, and inputs and compares the measurement data on the configuration of the casing upper half part gained by the casing upper half part configuration data gaining section 202, the measurement data on the configuration of the casing lower half part gained by the casing lower half part configuration data gaining section 203, and the simulation data on the configuration of the casing upper half part and the casing lower half part gained by the configuration simulation data gaining section 201, selecting one item of simulation data closest to the measurement data with respect to the configuration of the casing upper half part and the casing lower half part.

The configuration change amount calculation section 205 is electrically connected to the simulation data evaluation section 204, inputs the simulation data selected by the simulation data evaluation section 204, and, based on the input simulation data, calculates the change amount of the configuration of the casing upper half part and the casing lower half part when the casing upper half part is fastened to the casing lower half part in the open state by the bolts.

The installation position adjustment amount calculation section 206 is electrically connected to the configuration change amount calculation section 205, and inputs the change amount calculated by the configuration change amount calculation section 205, calculating the adjustment amount of the installation position of the stationary part inside the casing taking into account the input change amount.

The output section 207 is electrically connected to the installation position adjustment amount calculation section 206, and outputs the adjustment amount calculated by the installation position adjustment amount calculation section 206 to the output device (display means) 210.

The processing by the assembly work supporting system 200 according to the present embodiment is executed, for example, by a control program stored in a computer. In the following, the case will be described where the processing by the assembly work supporting system according to the present embodiment is executed by the control program stored in the computer.

Figure 13:
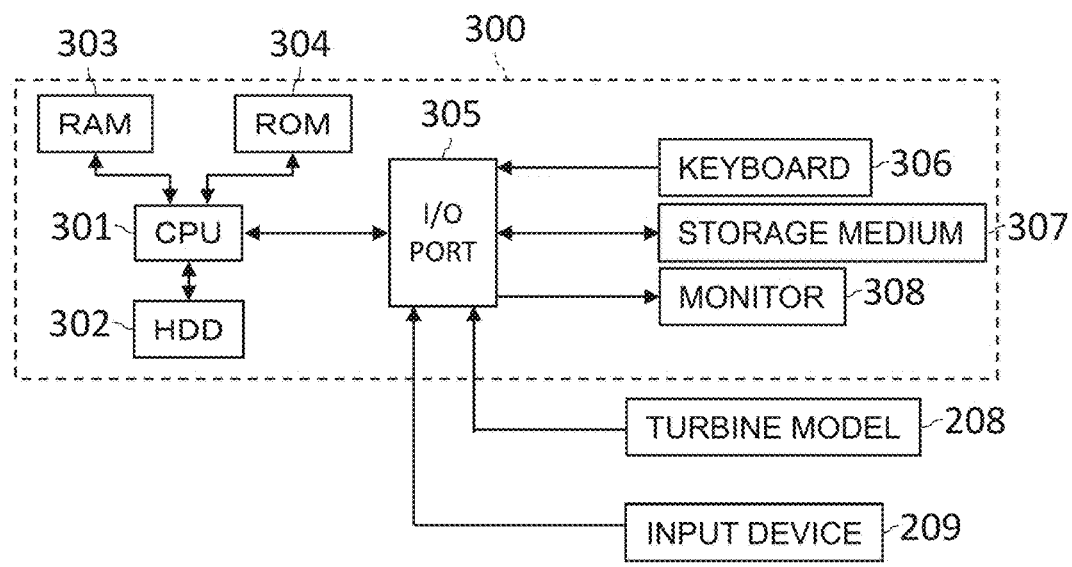
FIG. 13 is a schematic diagram illustrating a computer realizing the processing by the assembly work supporting system according to the fifth embodiment of the present invention.

FIG. 13 is a schematic diagram illustrating a computer realizing the processing by the assembly work supporting system according to the present embodiment. As shown in FIG. 13, as hardware, a computer 300 according to the present embodiment is equipped with a CPU (central processing unit) 301, an HDD (hard disk drive) 302, an RAM (random access memory) 303, an ROM (read-only memory) 304, an I/O port 305, a keyboard 306, a recording medium 307, and a monitor 308. There are no restrictions regarding the type of the computer 300. It may be of the desk top type, the notebook type, the tablet type or the like.

In the present embodiment, the control program is stored in the ROM 304, and the CPU 301 reads the control program from the ROM 304 and executes the same, whereby the assembly work supporting system 200 (the configuration simulation data gaining section 201, the casing upper half part configuration data gaining section 202, the casing lower half part configuration data gaining section 203, the simulation data evaluation section 204, the configuration change amount calculation section 205, the installation position adjustment amount calculation section 206, the output section 207, etc.) is loaded into the RAM 303, and is generated. In the present embodiment, the control program causes the configuration simulation data gaining section 201 to execute the processing of gaining the measurement data on the configuration of the casing upper half part not fastened to the casing lower half part. The control program causes the casing lower half part configuration data gaining section 203 to execute the processing of gaining the measurement data on the configuration of the casing lower half part in the open state. Further, the control program causes the measurement data on the configuration of the casing upper half part and the casing lower half part to be compared with the simulation data on the configuration of the casing upper half part and the casing lower half part obtained beforehand through numerical analysis with respect to the turbine model simulating the turbine characteristics, and causes the simulation data evaluation section 204 to execute the processing of selecting simulation data closest to the measurement data with respect to the configuration of the casing upper half part and the casing lower half part. Then, based on the simulation data selected by the simulation data evaluation section 204, the control program causes the configuration change amount calculation section 205 to execute the processing of calculating the change amount of the configuration of the casing upper half part and the casing lower half part when the casing upper half part is fastened to the casing lower half part in the open state by the bolts. Further, the control program causes the installation position adjustment amount calculation section 206 to execute the processing of calculating the adjustment amount of the installation position of the stationary part inside the casing taking into account the change amount calculated by the configuration change amount calculation section 205. Further, the control program causes the output section 207 to execute the processing of outputting the adjustment amount calculated by the installation position adjustment amount calculation section 206 to the display means. In the present embodiment, the values and signals input via the keyboard 306 are transmitted to the CPU 301 via the I/O port 305 along with the simulation data on the configuration of the casing upper half part and the casing lower half part and the measurement data on the configuration of the casing upper half part and the casing lower half part. The measurement data on the configuration of the casing upper half part and the casing lower half part, the simulation data on the configuration of the casing upper half part and the casing lower half part, the change amount of the configuration of the casing upper half part and the casing lower half part when the casing upper half part is fastened to the casing lower half part in the open state by the bolts, the adjustment amount of the installation position of the stationary part inside the casing, etc. are stored in the storage mediums such as the HDD 302 and the ROM 304. Further, the adjustment amount of the installation position of the stationary part inside the casing, etc. are displayed on a monitor (display means) 308 via the I/O port 305.

In this way, the processing by the assembly work supporting system 200 of the present embodiment may be executed by the control program stored in the computer. The control program may be installed from a server or the like to execute the above-described processing, or may be stored in the storage medium 307 and be read for the execution of the above processing. Various types of mediums can be used as the storage medium 307. Examples of the mediums that can be used include recording mediums such as a CD-ROM, a flexible disk, or a magneto-optical disk which records information optically, electrically or magnetically, and a semiconductor memory such as an ROM or flash memory which records information electrically. While in the above example the turbine model 208 is provided as hardware independent of the computer 300, this should not be construed restrictively. It is also possible to adopt a construction in which the CPU 301 reads the control program from the ROM 304 and executes it, whereby the program is loaded into the RAM 303.

Others

The present invention is not restricted to the embodiments described above but includes various modifications. For example, the above embodiments, which have been described in detail in order to facilitate the understanding of the present invention, are not always restricted to constructions equipped with all the components described above. For example, it is possible to replace a part of the construction of a certain embodiment by the construction of another embodiment, and it is possible to add to the construction of a certain embodiment the construction of another embodiment. Further, a part of the construction of each embodiment may be deleted.

In the embodiments described above, the present invention is applied to a steam turbine. The essential effect of the present invention, however, is to provide a method of assembling a turbine, an assembly work supporting system, and a control program that helps to maintain the accuracy in the positional adjustment of the stationary part while shorten the turbine assembly period through omission of the temporary assembly of the casing, and the present invention is not always restricted to the above-described constructions so long as it is possible to attain this effect. For example, it is also possible to apply the present invention to a gas turbine. In this case also, it is possible to attain the same effect as that of the above-described embodiment.

Further, while in the above-described embodiments the present invention is applied to a one-shaft turbine, the present invention is also applicable to a two-shaft turbine. In this case also, it is possible to attain the same effect as that of the embodiments described above.

DESCRIPTION OF REFERENCE CHARACTERS

3: Turbine rotor (rotor)
6: Diaphragm (stationary part)
11: Outer casing lower half part (casing lower half part)
12: Outer casing upper half part (casing upper half part)
13: Bolt
21: Inner casing lower half part (casing lower half part)
22: Inner casing upper half part (casing upper half part)
101: Steam turbine (turbine)

What is claimed is:

1. A method of assembling a turbine including a casing formed by fastening together a casing upper half part and a casing lower half part by bolts, a stationary part accommodated in the casing, and a rotor accommodated in the casing and configured to rotate with respect to the stationary part, the method comprising the steps of:

gaining measurement data on a configuration of the casing upper half part not fastened to the casing lower half part;

gaining measurement data on a configuration of the casing lower half part in an open state in which the casing upper half part and the rotor are removed and in which the stationary part is mounted;

comparing measurement data on the configuration of the casing upper half part and the casing lower half part with simulation data on the configuration of the casing upper half part and the casing lower half part previously obtained through numerical analysis of a turbine model simulating characteristics of the turbine to select simulation data closest to the measurement data with respect to the configuration of the casing upper half part and simulation data closest to the measurement data with respect to the configuration of the casing lower half part;

calculating, based on the selected simulation data, a change amount between the configuration of the casing lower half part in the open state in which the casing upper half part and the rotor are removed and in which the stationary part is mounted and the configuration of the casing upper half part and the casing lower half part when the casing upper half part is fastened to the casing lower half part in the open state by the bolts and the rotor is removed; and adjusting an installation position of the stationary part inside the casing taking into account the calculated change amount to assemble the turbine;

wherein the numerical analysis is creep deformation analysis based on a finite-element method; and values of parameters including a temperature of a working fluid supplied to the turbine, a heat transfer rate between the working fluid and the casing, and an operation time of the turbine are varied using a design condition of the turbine as a reference, and are input to the turbine model.

2. The method of assembling a turbine according to claim 1, wherein power law creep including Norton-Bailey law is used in the creep deformation analysis.

3. The method of assembling a turbine according to claim 1, wherein the measurement data on the configuration of the casing upper half part and the casing lower half part is obtained by measuring a surface configuration of the casing upper half part and the casing lower half part by a three-dimensional laser measurement device to gain a plurality of items of point data, and by turning the plurality of items of point data into surface data.

4. The method of assembling a turbine according to claim 1, wherein the measurement data on the configuration of the casing upper half part and the casing lower half part at a time of manufacturing the same is gained; and the numerical analysis is executed while reflecting the measurement data on the configuration of the casing upper half part and the casing lower half part at the time of manufacturing the same in the turbine model.

5. The method of assembling a turbine according to claim 4, wherein the measurement data on the configuration of the casing upper half part and the casing lower half part at the time of manufacturing the same is obtained by measuring a surface configuration of the casing upper half part and the casing lower half part at the time of manufacturing the same by a laser measurement device to gain a plurality of items of point data, and by turning the plurality of items of point data into surface data.

6. The method of assembling a turbine according to claim 1, wherein the numerical analysis is an elasticity analysis based on a finite-element method; and values of parameters including a material constant of the casing upper half part and the casing lower half part are varied using the design condition of the turbine as the reference, and are input to the turbine model.

7. The method of assembling a turbine according to claim 1, wherein measurement data on a configuration of the stationary part and the rotor not mounted to the casing lower half part is gained;

the measurement data on the stationary part and the rotor is compared with the simulation data on the configuration of the stationary part and the rotor obtained through the numerical analysis, and simulation data closest to the measurement data with respect to the configuration of the stationary part and the rotor is selected;

based on the selected simulation data, a clearance width between the stationary part and the rotor when the stationary part and the rotor are mounted to the casing lower half part is calculated; and the installation position of the stationary part inside the casing is adjusted further taking into account the calculated clearance width to assemble the turbine.

8. The method of assembling a turbine according to claim 7, wherein measurement data on the configuration of the stationary part and the rotor at a time of manufacturing the same is gained, and the numerical analysis is executed while reflecting the measurement data on the configuration of the stationary part and the rotor at the time of manufacturing the same in the turbine model.

9. The method of assembling a turbine according to claim 8, wherein the measurement data on the configuration of the stationary part and the rotor at the time of manufacturing the same is obtained by measuring the surface configuration of the stationary part and the rotor at the time of manufacturing the same by a laser measurement device to gain a plurality of items of point data, and by turning the plurality of items of point data into surface data.

10. The method of assembling a turbine according to claim 1, wherein the casing includes an outer casing and an inner casing provided on an inner side of the outer casing.

11. An assembly work supporting system for assembling a turbine including a casing formed by fastening together a casing upper half part and a casing lower half part by bolts, a stationary part accommodated in the casing, and a rotor accommodated in the casing and configured to rotate with respect to the stationary part, the assembly work supporting system comprising a computer programmed to execute steps of:

gaining measurement data on a configuration of the casing upper half part not fastened to the casing lower half part;

gaining measurement data on a configuration of the casing lower half part in an open state in which the casing upper half part and the rotor have been removed and in which the stationary part has been mounted;

gaining simulation data on the configuration of the casing upper half part and the casing lower half part obtained through numerical analysis based on a turbine model simulating characteristics of the turbine;

comparing measurement data on the configuration of the casing upper half part and the casing lower half part with simulation data on the configuration of the casing upper half part and the casing lower half part, and selecting simulation data closest to the measurement data with respect to the configuration of the casing upper half part and simulation data closest to the measurement data with respect to the configuration of the casing lower half part;

calculating, based on the selected simulation data, a change amount between the configuration of the casing lower half part in the open state in which the casing upper half part and the rotor are removed and in which the stationary part is mounted and the configuration of the casing upper half part and the casing lower half part when the casing upper half part is fastened to the casing lower half part in the open state by the bolts and the rotor is removed;

calculating an adjustment amount of an installation position of the stationary part inside the casing taking into account the change amount calculated; and outputting the adjustment amount to display means;

wherein the numerical analysis is creep deformation analysis based on a finite-element method; and values of parameters including a temperature of a working fluid supplied to the turbine, a heat transfer rate between the working fluid and the casing, and an operation time of the turbine are varied using a design condition of the turbine as a reference, and are input to the turbine model.

12. A non-transitory computer-readable medium storing a control program of an assembly work supporting system for assembling a turbine including a casing formed by fastening together a casing upper half part and a casing lower half part by bolts, a stationary part accommodated in the casing, and a rotor accommodated in the casing and configured to rotate with respect to the stationary part, the control program, when executed by a processor, causing the assembly work supporting system to execute:

a step of gaining measurement data on a configuration of the casing upper half part not fastened to the casing lower half part;

a step of gaining measurement data on a configuration of the casing lower half part in an open state in which the casing upper half part and the rotor have been removed and in which the stationary part has been mounted;

a step of comparing measurement data on the configuration of the casing upper half part and the casing lower half part with simulation data on the configuration of the casing upper half part and the casing lower half part previously obtained through numerical analysis with respect to a turbine model simulating characteristics of the turbine, and selecting simulation data closest to the measurement data with respect to the configuration of the casing upper half part and simulation data closest to the measurement data with respect to the configuration of the casing lower half part;

a step of calculating, based on the selected simulation data, a change amount between the configuration of the casing lower half part in the open state in which the casing upper half part and the rotor are removed and in which the stationary part is mounted and the configuration of the casing upper half part and the casing lower half part when the casing upper half part is fastened to the casing lower half part in the open state by the bolts and the rotor is removed;

a step of calculating an adjustment amount of an installation position of the stationary part inside the casing taking into account the change amount calculated; and a step of outputting the adjustment amount calculated to display means;

wherein the numerical analysis is creep deformation analysis based on a finite-element method; and values of parameters including a temperature of a working fluid supplied to the turbine, a heat transfer rate between the working fluid and the casing, and an operation time of the turbine are varied using a design condition of the turbine as a reference, and are input to the turbine model.

* * * * *